United States Patent [19]
Tanigawa et al.

[11] Patent Number: 6,119,650
[45] Date of Patent: Sep. 19, 2000

[54] ENERGY CONSERVATION CYCLE ENGINE

[76] Inventors: Hiroyasu Tanigawa; Kazunaga Tanigawa, both of 428-35, Enami, Okayama-shi, Okayama 702, Japan

[21] Appl. No.: 09/194,451
[22] PCT Filed: May 28, 1997
[86] PCT No.: PCT/JP97/01814
§ 371 Date: Nov. 23, 1998
§ 102(e) Date: Nov. 23, 1998
[87] PCT Pub. No.: WO97/45629
PCT Pub. Date: Dec. 4, 1997

[30] Foreign Application Priority Data

May 28, 1996 [JP] Japan .................................. 8-172752

[51] Int. Cl.[7] .................................................. F02B 19/00
[52] U.S. Cl. ............................................ 123/268; 123/292
[58] Field of Search ............................ 123/268, 292, 123/285, 274, 275

[56] References Cited

U.S. PATENT DOCUMENTS

| | | | |
|---|---|---|---|
| 4,875,445 | 10/1989 | Imoto et al. | 123/292 |
| 5,237,964 | 8/1993 | Tomoiu | 123/292 |
| 5,454,356 | 10/1995 | Kawamura | 123/292 |
| 5,950,593 | 9/1999 | Matsuoka et al. | 123/292 |

*Primary Examiner*—John Kwon
*Attorney, Agent, or Firm*—Flynn, Thiel, Boutell & Tanis, P.C.

[57] ABSTRACT

An energy conservation cycle engine which protects environmental pollution by reducing NOx gases, unburned materials and increases the specific output power per weight by reducing friction-loss and vibration, by reducing the wall thickness of the main combustion chamber, and by raising the maximum combustion pressure thereby reducing $CO_2$ in the exhaust gas. A piston has a cup-like recess at its top and a small diameter piston protrudes therefrom. A cylinder head conforms with the shape of the piston to accept the protruded portion so as to form two combustion chambers, a main chamber and a sub-chamber, and the lower end of the sub-chamber is tapered to accelerate the movement of the combustion gas between the two chambers.

30 Claims, 15 Drawing Sheets

ENERGY CONSERVATION CYCLE ENGINE

TECHNICAL FIELD OF THE INVENTION

The present invention relates to a piston reciprocating cycle, which converts conventional and special piston reciprocating motions to rotational power. More particularly, the present invention relates to an energy conservation cycle engine in which in order to improve the energy conversion efficiency of my previous invention, based on the third law of thermodynamics, "Energy transformation method and its system for piston reciprocating cycle" (Japanese Patent Application No. Hei 7-79292 and U.S. patent application Ser. No. 08/608,148) by conserving the major portion of the thermal energy within a main combustion chamber, thereby the amount of energy release (a stroke volume of the piston) at the top dead center becomes low and most of the thermal energy is obtained after 30 deg. in crank angle.

BACKGROUND OF THE INVENTION

In the prior art, as shown in FIG. 1(a), a combustion chamber is defined by a cylinder head and a piston. The diameter of the combustion chamber of the prior art is comparatively large and a combustion pressure and a combustion temperature are applied to the large area of the combustion chamber and piston. Since cooling is essentially required, as the combustion chamber increases in diameter and surface area, a cooling loss increases. Moreover, when increasing the maximum combustion pressure, a reinforcement depending on the combustion pressure is required, whereby the weight per output is increased. Similarly, when increasing the maximum combustion pressure, since the friction losses of a piston ring or the like are increased, the friction loss per output is increased.

At the moment of combustion, usually, a combustion period extends between nearly 40 deg. to 60 deg. in crank angle after the dead centers. However, when the piston begins to retract from the top dead center, the combustion chamber communicates with the cylinder, whereby in response to the retraction of the piston, the volume of the combustion chamber is increased rapidly. As a result, an extreme non-constant volume combustion is caused, so that the maximum combustion pressure and the maximum combustion temperature are lowered rapidly, whereby the combustion conditions deteriorate.

Moreover, when regulating the combustion conditions to reduce the generated NOx gases, the uncombusted portion of the fuel is increased, and when regulating the combustion conditions to reduce the uncombusted portion of the fuel, the generated NOx gases increase.

With reference to a pressure diagram of a constant pressure cycle engine shown in FIG. 2, another description is given. In the conventional constant pressure cycle engine, the major portion of the thermal energy generated by combustion, including the thermal energy at the maximum combustion pressure, is released as shown in FIG. 2, until 30 deg. in crank angle after the top dead center. Since before and after the top dead center, the friction loss is maximized, the thermal energy released is dissipated by the friction force, whereby the amount of work (a stroke volume of the piston) becomes extremely slight. On the one hand, at the best opportunity of 90 deg. in crank angle after the top dead center at which the friction loss is minimized and is most adapted to release the thermal energy, the thermal energy to be released is reduced by nearly one fourteenth, whereby thermal energy of nearly 30 percent is lost.

In the constant volume cycle engine, since the curves of a pressure diagram shown in FIG. 2 further is shifted to the top dead center side, thermal energy of 30 percent or more is lost.

That is, it has been the largest disadvantage in the prior art that the thermal energy to be released is released almost at the time when the friction loss is at a maximum.

The pressure diagram of the constant volume cycle engine shown in FIG. 2 is described as compared with the case where we make a bicycle to advance efficiently by pushing down vertically. In the conventional constant pressure cycle engine and the constant volume cycle engine, the major portion of the thermal energy generated by combustion is released from the top dead center to 30 deg. in crank angle after the top dead center. On the other hand, we do not attempt to release the entire energy in the vertical direction at the time when the bicycle pedal is at the top dead center. Especially, at 90 deg. in crank angle after the top dead center where the efficiency of the case of converting an up-and-down motion to rotating power becomes the best timing, the force to be applied to the bicycle pedal is never reduced to nearly one fourteenth.

Since we know well the laws of nature from the experimental laws, at the time when the bicycle pedal is at the top dead center, the force to be applied to the bicycle pedal is reduced to the minimum required, and to the timing of 90 deg. in crank angle after the top dead center where the efficiency of converting the up-and-down motion to rotating power becomes its maximum, the force to be applied to the bicycle pedal is expanded increasingly.

That is, at the top dead center, the friction loss is maximized, so that the efficiency of converting the up-and-down motion to rotating power becomes lowest. On the one hand, at 90 deg. in crank angle after the top dead center, the friction loss is minimized, so that the efficiency of converting the up-and-down motion to rotational power becomes its highest. This practice can be understood readily from FIG. 2.

Similarly to the case where we make the bicycle advance efficiently, the system which optimizes the distribution of the amount of release with respect to the timing of releasing of the thermal energy is the "Energy transformation method and its system for piston reciprocating cycle" (Japanese Patent Application No. Hei 7-79292 and U.S. patent application Ser. No. 08/608,148) which this applicant had invented previously.

Shifting the timing at which the release of the thermal energy becomes the minimum from the time when the friction loss is maximized to the time when the friction loss is minimized, the system which the "Energy transformation method and its system for piston reciprocating cycle" which increases the efficiency of the case of converting the up-and-down motion to rotating power further is improved is the present invention.

Moreover, although this applicant had applied an energy conservation cycle engine that by reciprocating motion of a dual enlarged head piston, a pendulum arm is pendulated to rotate a crankshaft by the pendulating motion to produce rotational power, there has been disadvantages that due to the pendulating motion of the pendulum arm, the volume is increased and the structure is sophisticated, whereby an improvement of the energy conservation cycle engine such that a shortened stroke engine is used to rotate the crankshaft directly to convert to rotational power to produce a large output in spite of being compact and lightweight is provided.

The main object of the invention is to improve the various energy conservation cycle engine of the previous application, whereby NOx gases and the uncombusted portion can be eliminated, thereby environmental pollution being reduced.

In converting from a piston motion to rotational power also, there are the objects of providing an increase in a rotating force and utilizing the conserved thermal energy as rotational energy usefully.

Furthermore, it is an object that the friction loss and vibration of the cycle engine are reduced to reduce the equivalent to the maximum bearing load, thereby increasing the maximum combustion pressure and reducing $CO_2$.

Moreover, as a further object, a thinning in wall thickness and reduction in weight of a main combustion chamber, weight reduction of a specific weight per output and an improvement of a scavenging effect are provided.

Furthermore, it is an object that, without reference to a kind of fuel, fuel ignition system, number of cycles, scavenging system and type of engine, while a specific output per weight is increased, the friction loss is reduced, thereby reducing environmental pollution including $CO_2$.

DISCLOSURE OF THE INVENTION

To solve the problems of the prior arts, the shape of a piston of this invention is formed as indicated in FIG. 1(c) into a stepped shape, comprising a large diameter portion (hereinafter referred to as an enlarged head piston) having a cup-like recess, and a small diameter second piston (hereinafter referred to as a small piston) which protrudes from the cup-like recess.

A cylinder head has a shape for accepting said pistons, consequently, a first combustion chamber (hereinafter referred to as a main combustion chamber) is defined by the small piston 23 and the cylinder head and a second combustion chamber (hereinafter referred to as a sub-combustion chamber) is mainly defined by the enlarged head piston 22 and the cylinder head.

For example, we consider a small piston having a diameter of one fifth of the enlarged head piston. Since the small piston has a diameter of one fifth of the enlarged head piston, the diameter of the main combustion chamber is also one fifth of that of the sub combustion chamber. Therefore, the thickness of the cylinder head defining the main combustion chamber can be reduced to one fifth, thereby the weight of the cylinder is reduced. Moreover, since the area of the piston defining the main combustion chamber is reduced to one twenty-fifth, the minimum bearing load applied to the piston is reduced to one twenty-fifth if the same combustion pressure is applied. Therefore, the maximum combustion pressure can be increased and the friction loss can be decreased. If the main combustion chamber and the sub combustion chamber communicates at an angle of 40 deg. in crank angle after the top dead center, the stroke volume of the piston is concluded at $\frac{1}{5}$ as compared with the conventional one, whereby the amount of the energy released becomes $\frac{1}{25}$, and consequently $\frac{24}{25}$ of the energy which used to be released is conserved. By releasing the conserved energy when the efficiency of the case of converting the linear motion to rotating power becomes the best timing, an energy conversion efficiency of the entire engine is increased.

If the volume of the combustion chamber exceeds a certain volume, the combustion temperature exceeds 3500° C., and the combustion pressure increases, it is preferable to add a water injection means 5 to increase the volume of water vapor. Moreover, an adiabatic non-cooling engine which is most likely to adapt to the hydrogen fuel can be realized, thereby by the steam and internal combustion coalition engine, environmental pollution will be decreased. Due to the pressure difference between the two combustion chambers at the time of communication, a combustion gas is injected into the cup-like recess 1 to be whirled, the fuel is burnt perfectly, thereby $CO_2$ and the environmental pollution are reduced.

To increase the efficiency of the engine, it is preferable to provide a tapered reduced diameter portion 7 acting as a fan-shaped nozzle to the cylinder head. The combustion gas can move from the main combustion chamber to the sub-combustion chamber quickly.

Moreover, as shown in FIG. 1(d), at least a part of the cup-like recess of the enlarged head piston consists of a straight line, and a scavenging port and an exhaust port are disposed at the side of the cylinder, thereby the scavenging effect may be improved.

DESCRIPTION OF THE SYMBOLS

Figure 1A:
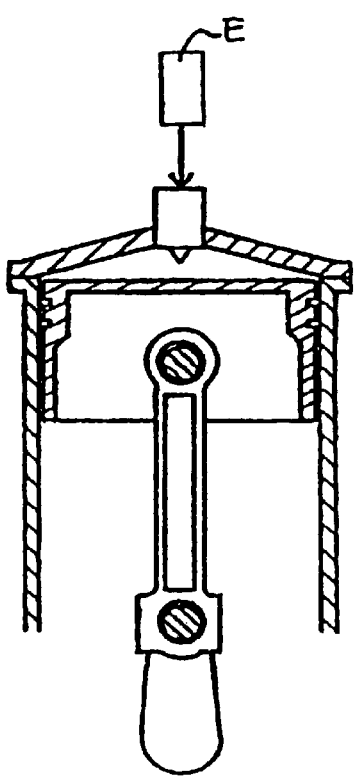
FIGS. 1(a), (b), (c) and (d) are partial sectional views describing an embodiment of an energy conservation cycle engine of type A of the present invention.

1: cup-like recess
2: tapered bottom section
3: check valve
4: one-way air channel
5: fuel and water injection means
6: sword guard projections and depressions
7: tapered reduced diameter portion
12: parallel track
13: body side cam
14: inclined air passage
15: noise-reducing groove (a plurality of grooves extending obliquely)
16: cylinder bore
17: engagement synchronous means
18: exhaust-section heat exchanger means
19: reduced diameter section heat exchanger member
20: combustion section heat exchanger member
21: heat resisting and corrosion resisting heat-insulating member
22: enlarged piston head
23: small piston (second piston)
24: combustion chamber with the expanded diameter (second combustion chamber)
25: combustion chamber with the reduced diameter (first combustion chamber)
26: pendulum arm
27: crankshaft
28: flywheel
29: crankshaft side translation bearing
30: dual enlarged piston head
31: cylinder
32: cylinder head
33: exhaust port
34: scavenging port
36: exhaust section
37: turbocharger
38: piston bore
39: pendulum side cam
40: crankshaft side cam
41: heat-insulating materials
42: water injection means
43: projection
44: supercharging piston
45: charging valve
46: scavenging valve
47: the bearing unit
48: pendulum side parallel track
49: tapered periphery section
50: inclined scavenging port
51: inclined exhaust port
52: cylinder-side parallel track assembling hole
53: pendulum side translation bearing
54: connecting rod
55: piston-supercharger
56: mechanical supercharger
57: controller
58: dovetail groove for assembling
E: isolation releasing
W: water
A: air
O: exhaust
a: best opportunity
b: worst period
C: crankshaft angle
P: combustion pressure
M: motoring
H: heat-generating ratio
S: isolation initiation
E: isolation release

BEST MODE OF THE INVENTION

Figure 1B:
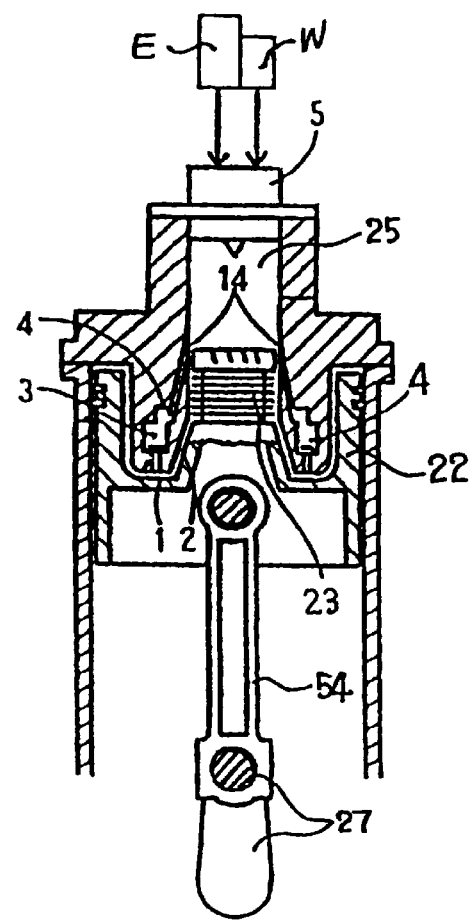
Figure 1C:
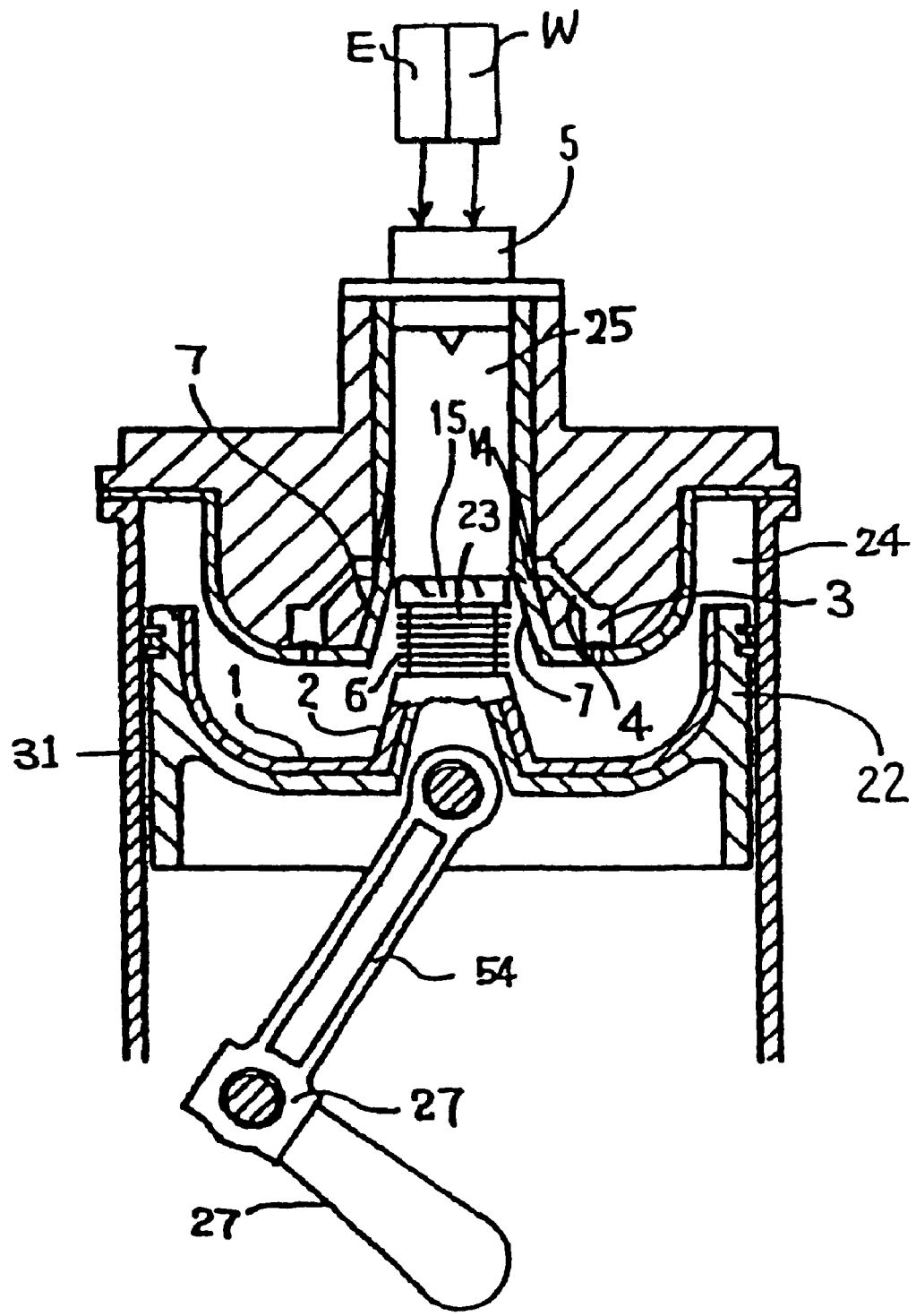

With reference to an embodiment of an energy conservation cycle engine (the energy conservation cycle engine of type A) using a conventional crank mechanism of FIG. 1(b), (c) and (d) and FIG. 1, the invention is described.

From the nearby central portion of a cup-like recess 1 of an enlarged piston head 22, a small piston 23 having a tapered bottom section 2 (including a cylindrical shape) protrudes.

The enlarged piston head reciprocates between the top dead center and the bottom dead center, and in an energy conservation cycle engine of a two-stroke cycle of type A performing conventional scavenging and exhausting, by the lifting of the enlarged piston head 22, by means of the small piston 23 having a tapered bottom section 2, the isolation of the main combustion chamber 25 with the reduced diameter having the tapered reduced diameter portion 7 is initiated. Subsequently, the air compressed by the main combustion chamber 24 with the expanded diameter is injected into the main combustion chamber 25 with the reduced diameter through the one-way air channel 4 including a check valve 3 and an inclined air passage 14. After the compressed air in the main combustion chamber with the reduced diameter is mixed and churned with the fuel injected from a fuel and water injection means 5, the air is ignited to combust. In the main combustion chamber 25 with the reduced diameter exceeding a certain volume, water injection can be performed, whereby a steam and internal combustion coalition engine can be realized. When the enlarged piston head 22 begins to retract, the pressure in the combustion chamber with the expanded diameter begins to reduce, and by means of sword guard-like projections and depressions 6 provided on the periphery of the small piston 23 in a multi-stage form, leakage of the combustion gas can be optimized. When the enlarged piston head 22 retracts, for example, up to 40 deg. in crank angle after the dead centers, the main combustion chamber 25 with the reduced diameter communicates with the main combustion chamber 24 with the expanded diameter. At this time, the tapered reduction diameter portion 7 functions as a fan-shaped nozzle, whereby the combustion gas is injected into the cup-like recess 1 at high speed, so that the combustion gas is churned by the difference in pressure, thereby the uncombusted portion is combusted perfectly. Moreover, by a reaction plus an impulse and plus a pressure due to speed-type energy and volume-type energy, the enlarged head piston can be retracted strongly to generate a rotating force to improve the thermal efficiency and reduce environmental pollution.

Figure 1D:
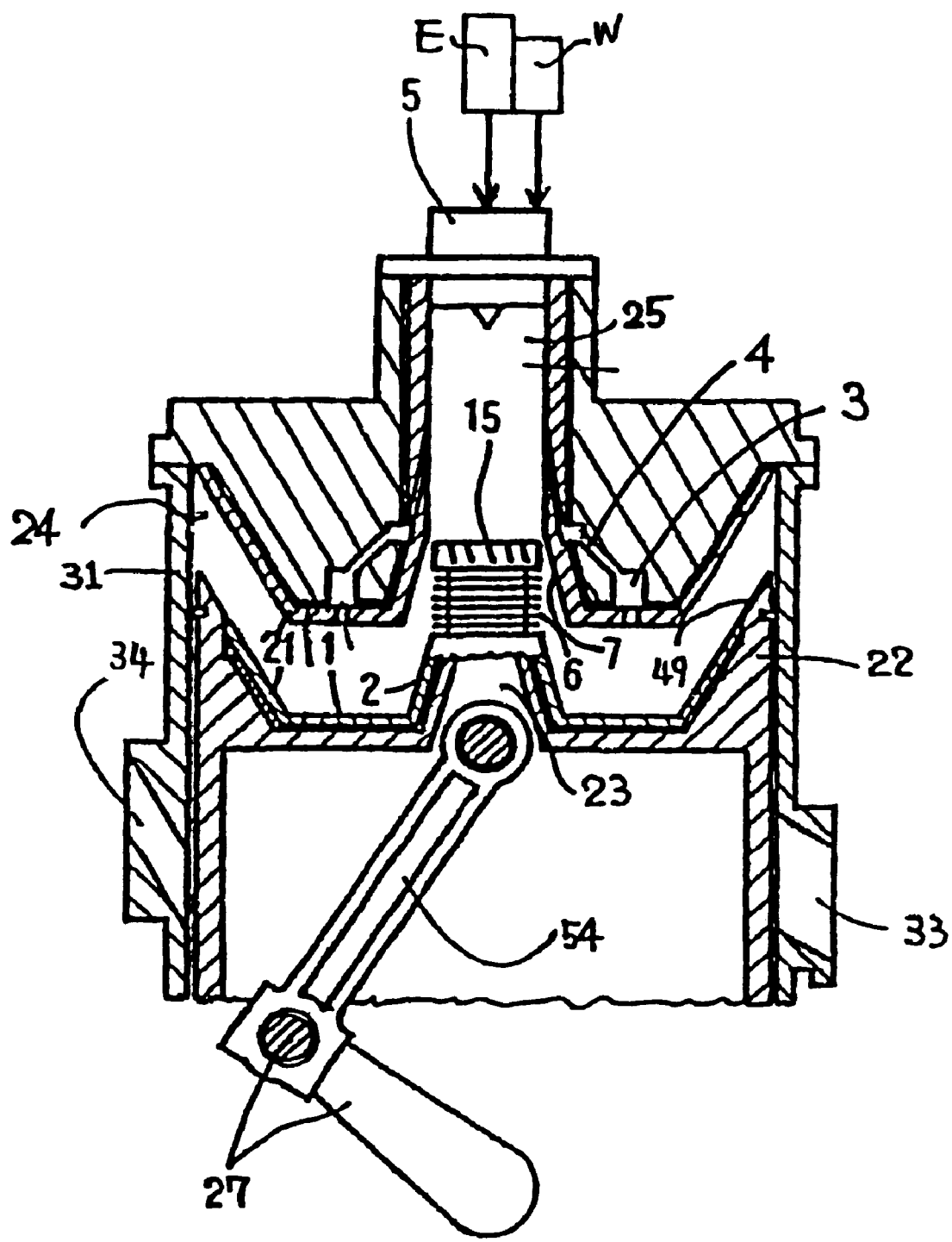
Figure 2:
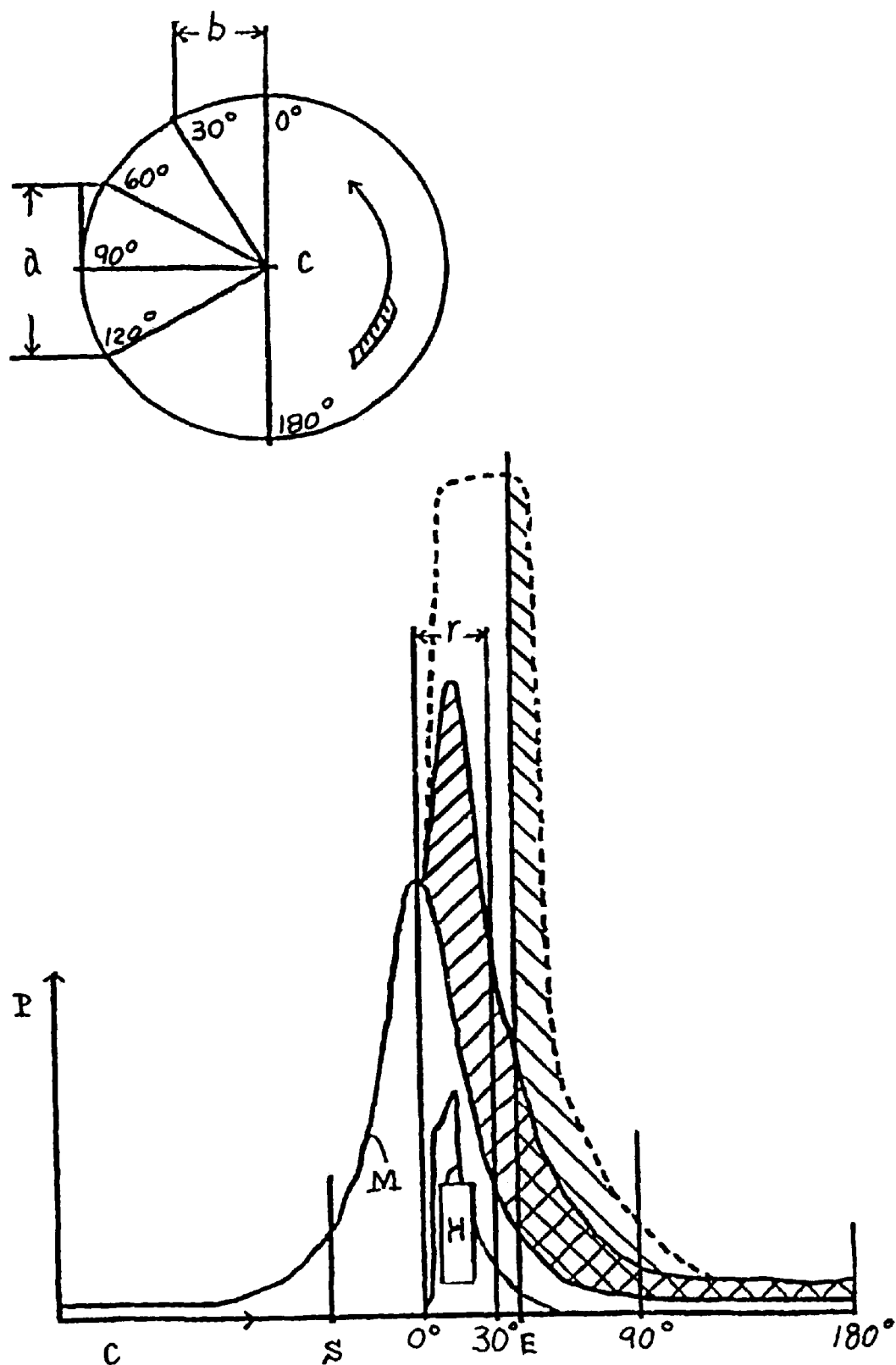
FIG. 2 is a schematic chart showing the changes of the combustion pressure with respect to a crank angle of the energy conservation cycle engines of various types according to the invention.

Moreover, when the enlarged piston head shown in FIG. 1(d) retracts, for example, up to 40 deg. in crank angle after the dead centers, the isolated combustion in the main combustion chamber 25 with the reduced diameter is released, whereby the tapered reduced diameter portion 7 constitutes the fan-shaped nozzle to inject the combustion gas onto the top of the small piston correctly and at high speed. However, the deeper the recess 1 is, the more the oscillation of the piston is reduced, so that a scavenging efficiency is lowered, whereby on a part of the recess 1, a straight line portion 49 (hereinafter referred to as a tapered periphery section) is provided and to provide an inclined scavenging port 34 at an inclined angle as required to inject a scavenging gas onto a bottom of the recess 1 to improve the scavenging efficiency.

Moreover, by the addition of dynamic pressure, in a process providing a great increase in output, a high speed injection and churning combustion based on a great difference in pressure can be obtained to eliminate twice as much of the uncombusted portion completely to generate a great rotational power, greatly increase the thermal efficiency and greatly reduce environmental pollution by shifting the conventional scavenging and exhaust gases through the inclined scavenging port 34 and an inclined exhaust port 33.

Figure 3:
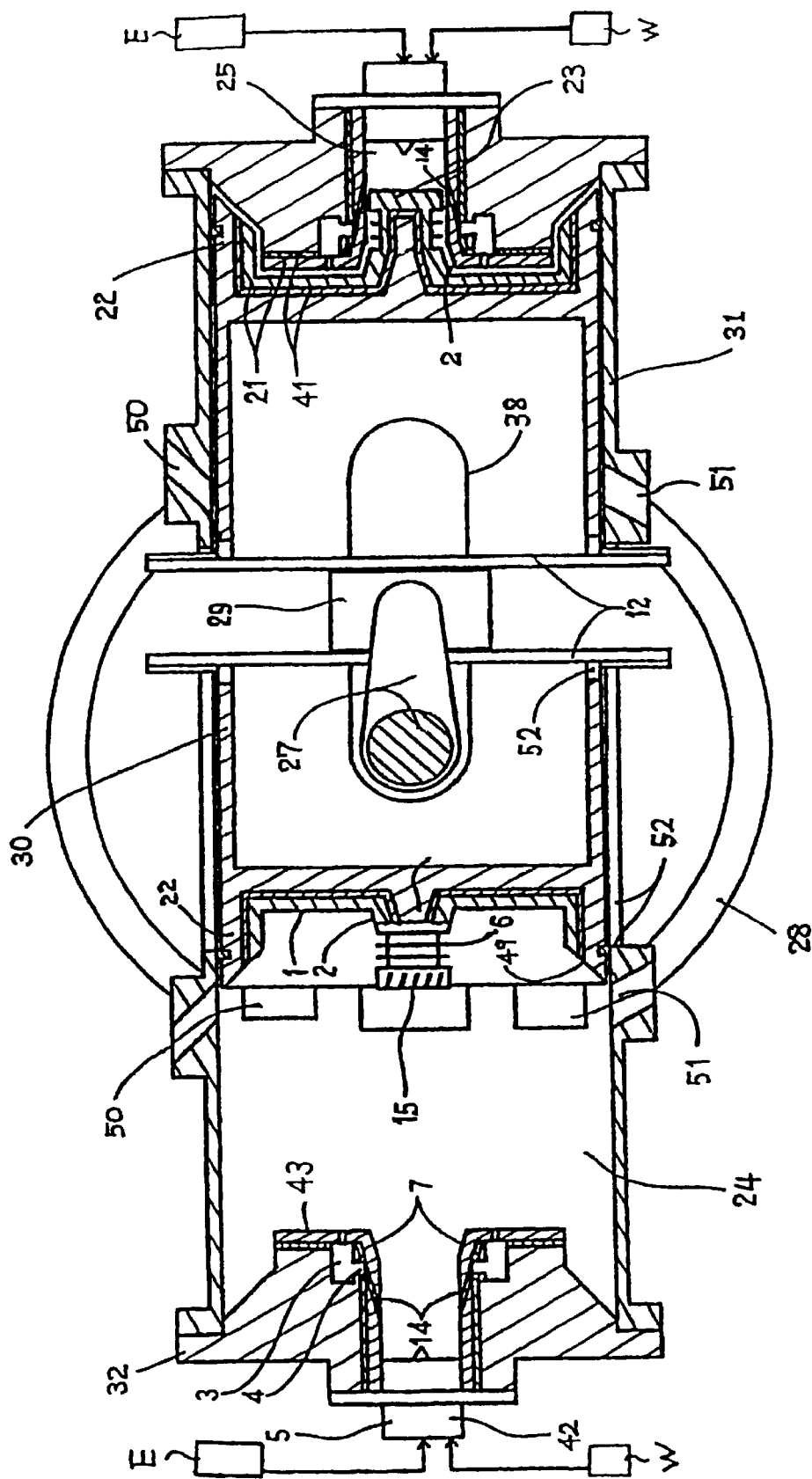
FIG. 3 is a partial sectional view of an embodiment of an energy conservation cycle engine of type D according to the invention.

FIG. 3 shows a dual enlarged piston head 30 having enlarged piston heads 22 at both right and left sides. Moreover, the small pistons 23 have tapered end sections 2, inclined noise reducing grooves 15 at its top and projections and depressions 6 therebetween which protrude from the center of the cup-like recess 1 of the enlarged piston heads 22 of the right and left of the dual enlarged piston head 30. Said dual enlarged piston head 30 reciprocates between the top dead center and the bottom dead center to perform conventional exhausting and scavenging.

In a two-cycle energy conservation cycle engine of type D using the dual enlarged piston head 30, at a compression stroke process after scavenging, by the small piston 23, the isolation of the main combustion chamber 25 with the reduced diameter is initiated. Subsequently, the air compressed in the combustion chamber 24 with the reduced diameter is injected into the main combustion chamber 25 with the reduced diameter through the one-way air channels 4 including the check valves 3 and the inclined air passages 14. After the compressed air in the main combustion chamber 25 with the reduced diameter is churned and mixed with the fuel injected from the fuel and water injection means 5, it is ignited to combust. Since in the main combustion chamber 25 with the reduced diameter, scavenging is difficult, residual gases are increased. As a result, at combustion, NOx is hardly generated. Moreover, in the main combustion chamber 25 with the reduced diameter exceeding a certain volume, water injection is further performed, whereby a steam and internal combustion coalition engine can be realized. According to the steam and internal combustion coalition engine, a combustion in which NOx and an uncombusted portion are not formed can be performed. When the enlarged piston head 22 begins to retract, the pressure on the small piston 23 begins to reduce, and by means of sword guard-like projections and depressions 6 provided on the periphery of the small piston 23 in the multi-stage form, the leakage of the combustion gas can be optimized.

When the enlarged piston head 22 further retracts, the main combustion chamber 25 with the reduced diameter communicates with the main combustion chamber 24 with the expanded diameter. While the noise-reducing groove 15 of the small piston 23 establishes the injection direction of the combustion gas, the sound is reduced. Subsequently, the tapered reduced diameter portion of the fan-shaped nozzle 7 injects the combustion gas into the cup-like recess 1, whereby a rotational force is increased. At this time, while the combustion gas is churned by the difference in pressure at high speed, the combustion gas is designed to be combusted, whereby twice as much of the uncombusted portion can be eliminated completely. The enlarged piston head 22 can be retracted strongly by the speed-type energy plus volume-type energy.

At this point, a reciprocating motion by a pendulum piston crank mechanism in the energy conservation cycle engine of type B is described. The most important practice is that the reciprocating motion cannot decrease the rotational power.

In a perfectly elastic collision, since at the moment of the collision, the kinetic energy is not decreased, the reciprocating motion of the two-cycle dual enlarged piston head becomes the most preferable manner. Moreover, it is important that at converting the reciprocating motion to rotational motion, the kinetic energy also is not decreased, for this reason, the reciprocating motion by the pendulum piston crank mechanism becomes preferable.

That is, the reciprocating motion of the pendulum can be continued at a constant speed, even though the weight is increased, as long as the length is identical. When a conventional cylinder crank engine is rotated with full force, the rotation is performed eight times to ten times by inertia, in contrast with this, when being rotated as a substitute of the reciprocating portions, such as the piston under the condition of hanging a weight of 5 kg with full force, due to a great decrease in the kinetic energy, it becomes hard to rotate even only one time. Therefore, the two-cycle pendulum piston crank mechanism becomes the preferable manner. Whereas the decrease and loss of the kinetic energy are 30 to 20 percentage in the conventional four-cycle engine and 15 to 10 percentage in the conventional two-cycle engine, it approaches zero percentage in the two-cycle dual pendulum piston engine. Moreover, in the conventional crank engine, the weight reduction of the reciprocating portions provides a large effect on a specific output such as the increase in the piston speed and the improvement in the thermal efficiency.

The pendulum arm swings to rotate the crankshaft to produce power, the volume is increased and the structure is sophisticated. In order to convert the kinetic energy to rotational power efficiently, it is preferable to realize a shortened stroke, for this reason, when by the reciprocating motion of the dual enlarged head piston, the crankshaft is rotated directly to convert to rotational power, a large output in a compact and lightweight form further can be produced.

Accordingly, when on the nearby central portion of the cylindrical portion of the dual enlarged piston head, providing a parallel track accepting and retaining a crankshaft side cam or a crankshaft side translation bearing (including a slide way) in a manner to reciprocally move freely in parallel with and in the radial direction, and accepting and retaining in a manner to reciprocally move freely the crankshaft side cam or the crankshaft side translation bearing bearing the crankshaft rotatably freely thereon, by the reciprocating motion of the dual enlarged piston head, the crankshaft including an engagement synchronous means 17 and a flywheel can be rotated directly to produce rotating power efficiently, and a specific volume and a specific weight can be greatly reduced.

Hereinafter, this mechanism is described specifically.

Figure 4:
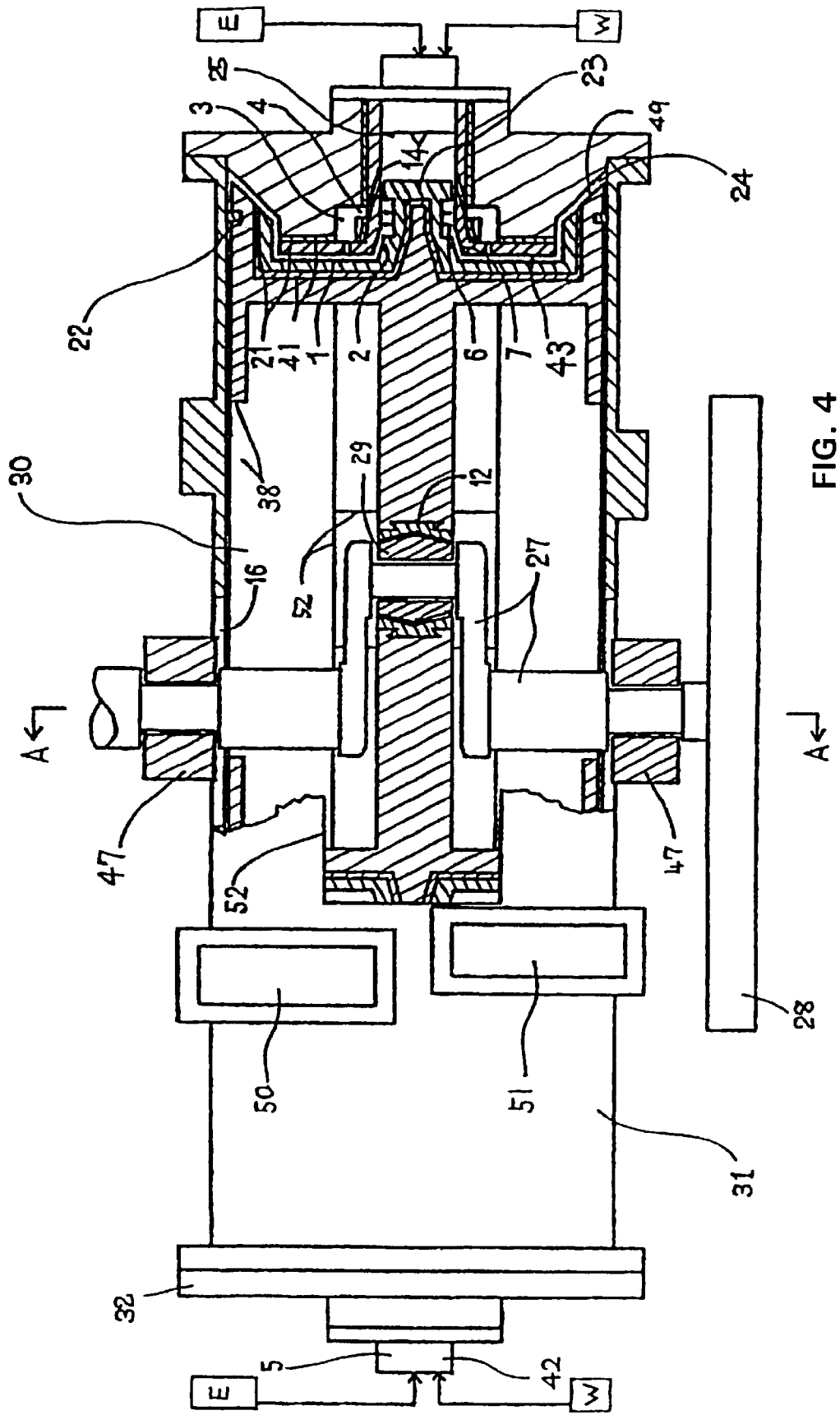
FIG. 4 is a partial sectional view showing a plane of the embodiment of an energy conservation cycle engine of type D of FIG. 3.
Figure 12:
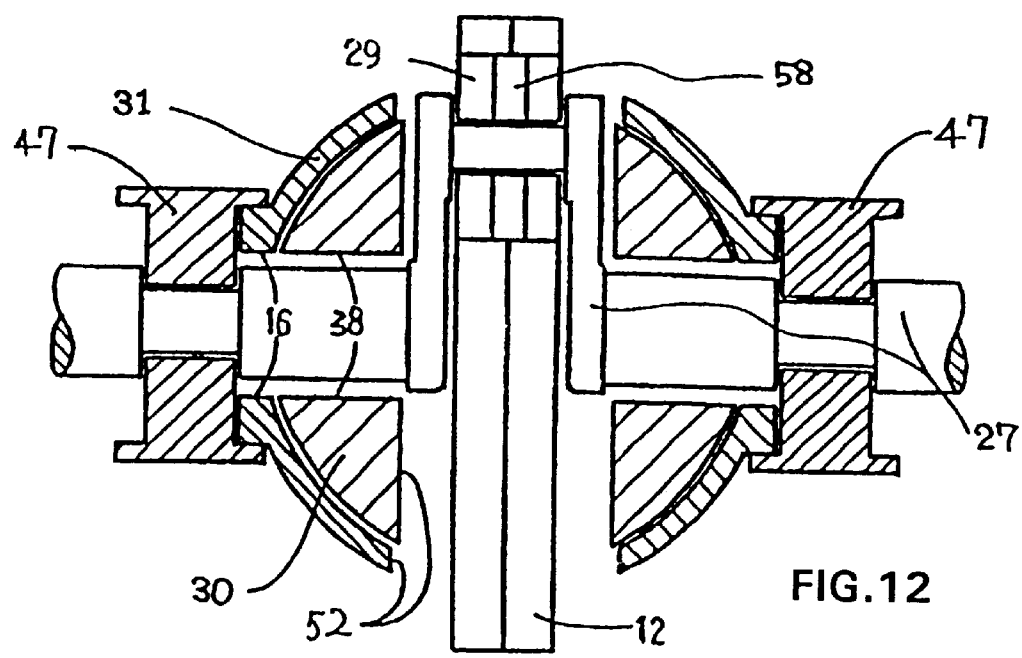
FIG. 12 is a sectional view for describing a crankshaft-mounting situation of the energy conservation cycle engines of type D, type E, type F and type G along line A—A in FIG. 4.

An embodiment of an energy conservation cycle internal combustion engine of type D shown in FIG. 3, FIG. 4 and FIG. 12 is described.

In the dual enlarged piston head, a part of the cup-like recess of the piston is formed into a linear form, further, in the right and left cylinders, inclined scavenging ports 50 and inclined exhaust ports 51 performing scavenging and exhausting functions are provided.

Moreover, by a reaction plus an impulse and plus a pressure due to the speed-type energy plus the volume-type energy, the enlarged piston head can be retracted strongly to generate a great rotational force to improve the thermal efficiency and reduce environmental pollution to shift to the conventional scavenging and exhausting. Moreover, the inclined scavenging ports 50 are slanted in a manner to fit to an inclined angle of a tapered periphery section to inject a scavenging gas onto the bottom of the recesses 1 and the inclined exhaust ports 51 are slanted mainly in the reverse direction thereto to improve the scavenging efficiency.

Hereinafter, a mechanism according to this embodiment is described specifically. Before and after the dead centers of the right and left, the conventional scavenging and exhausting are performed through the inclined scavenging ports 50 and the inclined exhaust ports 51. In the compression process after scavenging, by the tapered bottom sections 2, the sword guard projections and depressions 6 and the small pistons provided with a plurality of noise reducing grooves 15 extend parallel or inclinedly with respect to the moving direction in a manner to maintain the rear ends as required on the periphery of the projections wide of the tips, the isolation of the main combustion chambers 25 with the reduced diameter having the tapered reduced diameter portions 7 is initiated. Subsequently, the air compressed in the combustion chamber 24 with the expanded diameter is injected from a plurality of inclined air passages 14 through the one-way air channels 4 including the check valves 3 inserted from the combustion chamber with the expanded diameter sides and fixed into the inside of the main combustion chamber with the reduced diameter in a slanted direction and to be churned and mixed up with the fuel injected from the fuel injection devices 5 into the main combustion chamber with the reduced diameter to combust under the isolated condition. In the main combustion chambers 25 with the reduced diameter exceeding a certain volume, water injection by a water injection means 42 further can be performed, whereby a steam and internal combustion coalition engine can be realized.

When the dual enlarged piston head begins to retract, the pressure in the combustion chamber with the expanded diameter begins to reduce, whereby by means of sword guard-like projections and depressions 6 provided on a periphery of the small piston in a multi-stage form, the pressure is reduced in multistages to establish a leakage of the combustion gas optimally. When the enlarged piston head further retracts, the isolated combustion in the main combustion chambers with the reduced diameter is released, and while first, by the noise reducing grooves 15 of the small pistons, the injection direction of the combustion gas is established, the noise is reduced, while secondly, the tapered reduced diameter portions 7 constitute fan-shaped nozzles to inject a combustion gas onto the recesses 1 correctly and at high speed to greatly increase a rotational force, in a high speed injection process, a high-speed injection and a churning combustion by the large difference in pressure is realized, whereby the uncombusted portion is eliminated completely. In parallel with this, by a reaction plus an impulse and a pressure due to the speed-type mass energy plus the volume-type energy, the enlarged piston head retracts strongly to generate a great rotational force to improve the thermal efficiency and greatly reduce environmental pollution. Then, it shifts to the conventional scavenging and exhausting, and the inclined scavenging ports 50 are slanted in a manner to form an inclined angle of tapered periphery sections 49 to inject a scavenging gas onto the bottom of the recesses 1 and the inclined exhaust ports 51 are slanted mainly in the reverse direction thereto to improve the scavenging efficiency.

With reference to FIG. 3 and FIG. 4, on a little to the center of the right and left of the cylindrical cylinder, the inclined scavenging ports 50 and the inclined exhaust ports 51 are provided respectively as required, and between the cylinder heads fixed to the right and left and the respective enlarged piston head of the dual enlarged piston head, the combustion chamber with the expanded diameter is defined. In the approximate center of the cylinder head, the combustion chambers with the reduced diameter are provided respectively, and so that the fuel can be injected and combusted, the fuel injection devices 5 are provided respectively. Further, the water injection means 42 for modifying the combustion to a combustion having a greatly reduced NOx are additionally provided respectively. Moreover, in order to eliminate the cooling loss from the main combustion chambers with the reduced diameter and the combustion chambers with the expanded diameter, the combustion chambers with the reduced diameter, the tapered reduced diameter portions 7, the projections 43, said small piston, the tapered bottom sections 2 and the recesses 1 are provided as a heat resistance, corrosion resistance and heat insulated structure by heat resisting corrosion resisting materials 21 and heat insulating materials 41. Moreover, in the heat resisting and corrosion resisting materials 21 of the combustion chambers with the reduced diameter, a plurality of inclined air passages 14 are provided. Moreover, as is mentioned above, since for the energy conservation cycle engine, the shortened stroke engine or a very-shortened stroke engine is preferable, on a nearby central position and in the radial direction of the cylinder, and into a cross-like form, the cylinder bore 16 and a cylinder-side parallel track assembling ports 52 are provided, and on a nearby central position and in the radial direction of the dual enlarged piston head, and into a cross-like form, the piston bore 38 and the cylinder-side parallel track assembling ports 52 are provided. A parallel track 12 for rotating the crankshaft born by a bearing unit 47 through the reciprocating motion is provided in parallel, and to insert and retain a crankshaft side cam 40 or a crankshaft side translation bearing 29 which is rotatably outer-fitted and pivoted to the crankshaft between the parallel track 12 in a manner to reciprocally move freely and to rotate directly the crankshaft including the flywheel by the reciprocating motion of the dual enlarged piston head to produce the rotational power.

Figure 5:
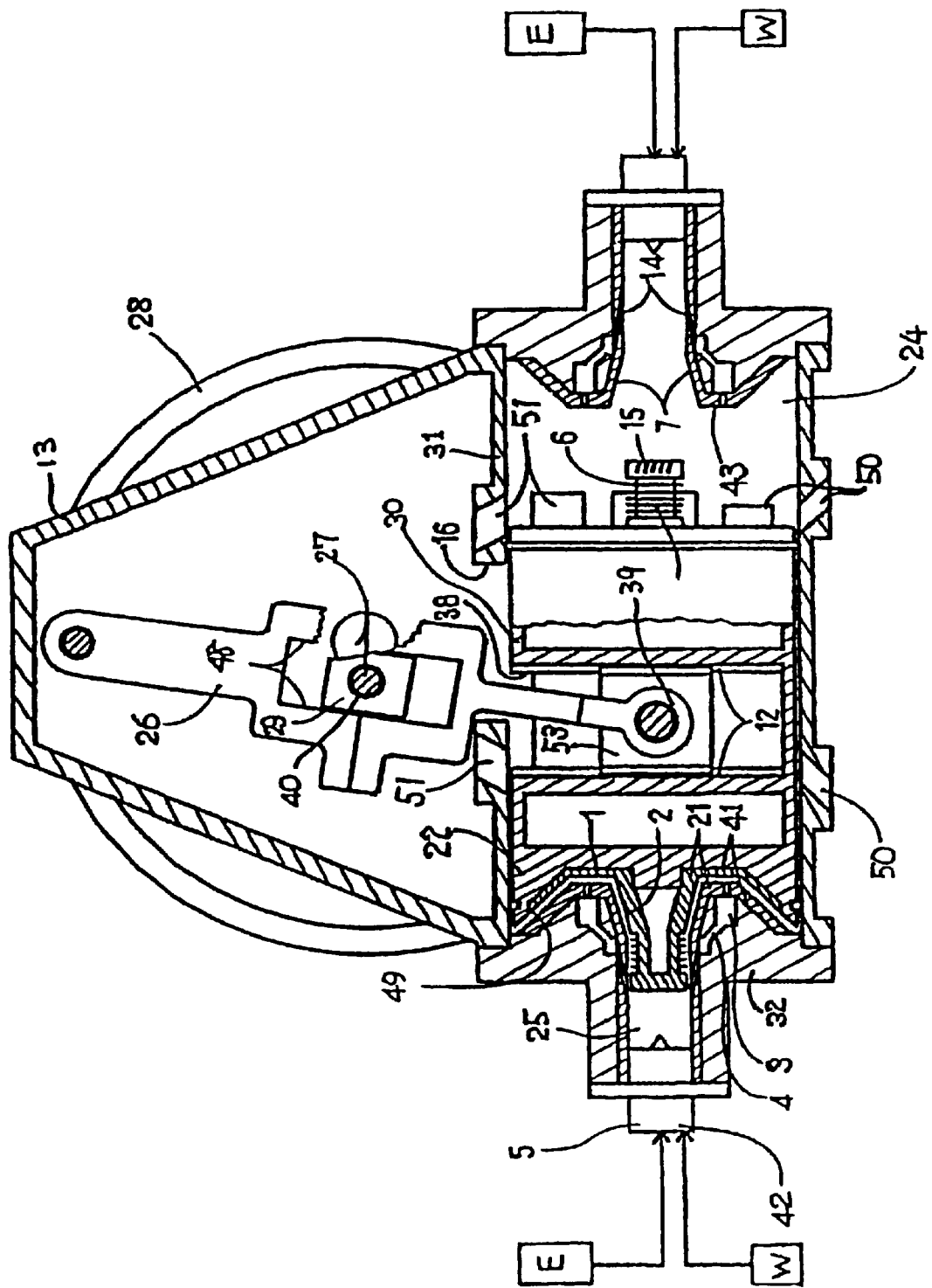
FIG. 5 is a partial sectional view of an embodiment of an energy conservation cycle engine of type B according to the invention.
Figure 6:
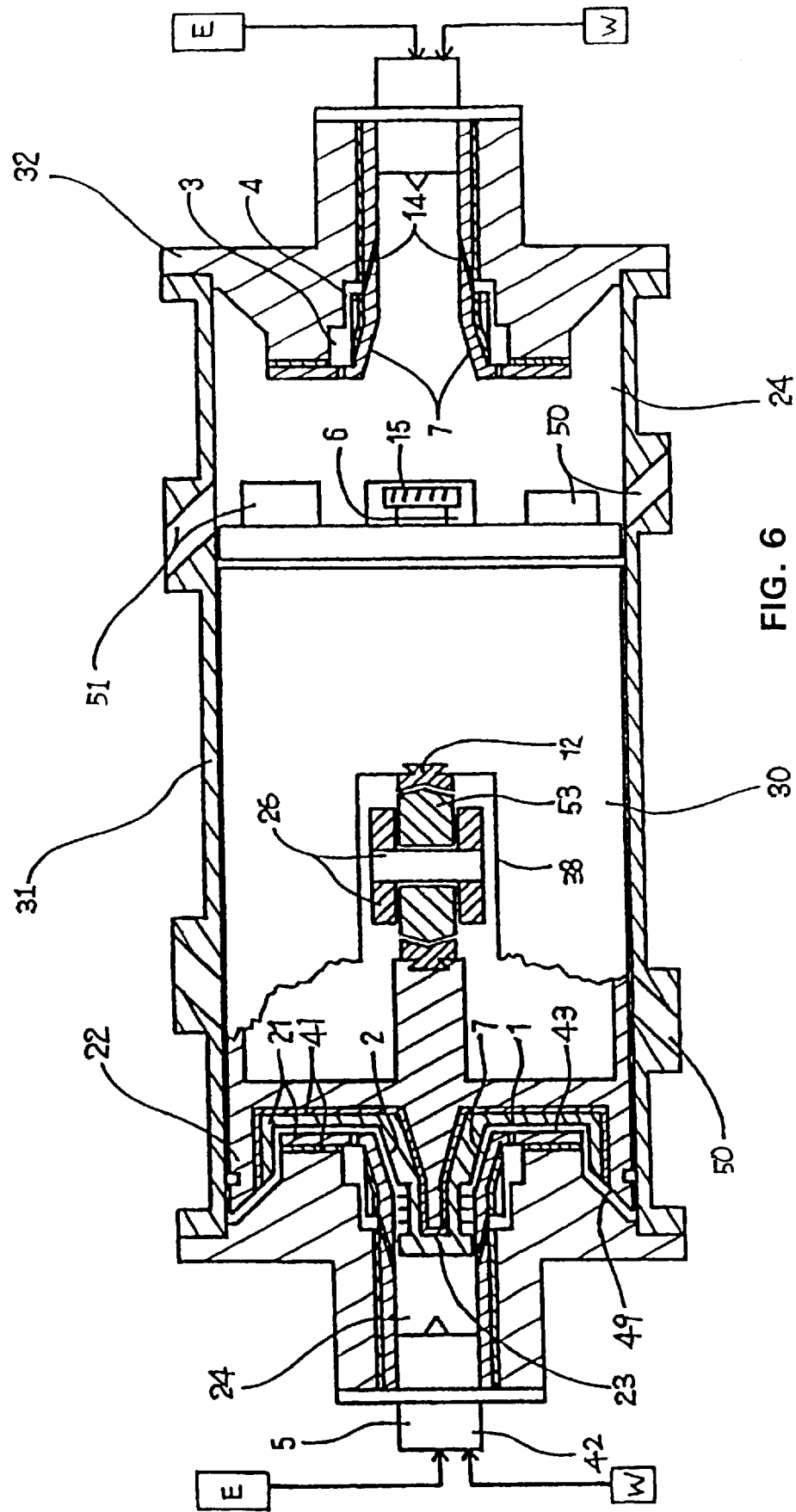
FIG. 6 is a partial sectional view showing a plan view of the embodiment of the energy conservation cycle engine of type B of FIG. 3.

With reference to FIG. 5 and FIG. 6, another embodiment of the energy conservation cycle internal combustion engine of type B is described. Since a primary section of the energy conservation cycle engine of type B is similar to said energy conservation cycle engine of type D shown in FIG. 3., the pendulum piston crank mechanism and a portion which is lacking in the description are described.

The pendulum arm reciprocates in the right and left directions in a manner to facilitate the pendulating motion between the left dead center and the right dead center of the cylinder provided with the cylinder bore 16. In the nearby central portion of the cylindrical portion of the dual enlarged piston head, the piston bore 38 in which the pendulum arm is inserted is provided, and in a radial direction, a pendulum side cam 39 or a pendulum side translation bearing 53 is inserted and retained. A parallel track 12 is provided in which the translation bearing 53 is inserted and retained in a manner to reciprocally move freely therein. By the reciprocating motion of the dual enlarged piston head, the pendulum arm oscillates, and between the parallel track 12, the pendulum side cam 39 or the pendulum side translation bearing 53 moves in a manner to reciprocate readily. The pendulum arm hanging at the upper portion thereof by a body side 13 in a manner to facilitate the pendulating motion rotates the crankshaft and the flywheel by oscillation of the pendulum arm. By the crankshaft side translation bearing 29 (including the slide way) or the crankshaft side cam 40 pivoted by the pendulum arm in a manner to facilitate the up-and-down motion into the pendulum side parallel track 48, the crankshaft is pivoted rotatably freely. According to this constitution, by the reciprocating motion of the dual enlarged piston head, the pendulum arm is pendulated to rotate the crankshaft by the pendulating motion to produce rotational power.

When the bore of the combustion chamber with the reduced diameter is reduced, for example, to one fifth in diameter to realize the isolated combustion, the wall thickness of the high pressure main combustion chambers with the reduced diameter can be reduced up to one fifth to achieve a great weight reduction, whereby a churning combustion which approaches the constant volume combustion of twenty-five times as compared with the prior art is realized. Moreover, since, due to the high-speed injection and churning combustion by the large difference in pressure caused by the isolated combustion, for the combustion period of time, the combustion condition can be improved to two times the limit, so that the combustion can be greatly improved. Moreover, since, including an adiabatic non-cooling engine also, by the steam and internal combustion coalition engine water-injection from the water injection means 42, NOx and the uncombusted portion are eliminated completely at the same time, an improvement of two times for the combustion period of time can be performed, in addition, the load causing the maximum friction load and the maximum bearing load due to the maximum combustion pressure can be reduced to one twenty-fifth to greatly reduce vibration factors. On the one hand, while the speed-type mass energy and volume-type energy are injected into the recesses 1, said energy being included in the high pressure gas including the water vapor mass volume increased greatly, and to retract the dual enlarged piston head strongly by a reaction plus an impulse and plus a pressure due to the speed-type energy and volume-type energy and to generate a large rotational force, the influences of preignition and an abnormal combustion also are reduced to one twenty-fifth, whereby an early perfect-combustion completion technology using the preignition and the abnormal combustion effectively can be realized. Moreover, the combustion chambers with the expanded diameter become thin-walled combustion chambers low in pressure and low in temperature by a large amount, whereby, while the entire engine is greatly reduced in weight to greatly increase a specific output per unit weight, environmental pollution including NOx can be greatly reduced.

Figure 7:
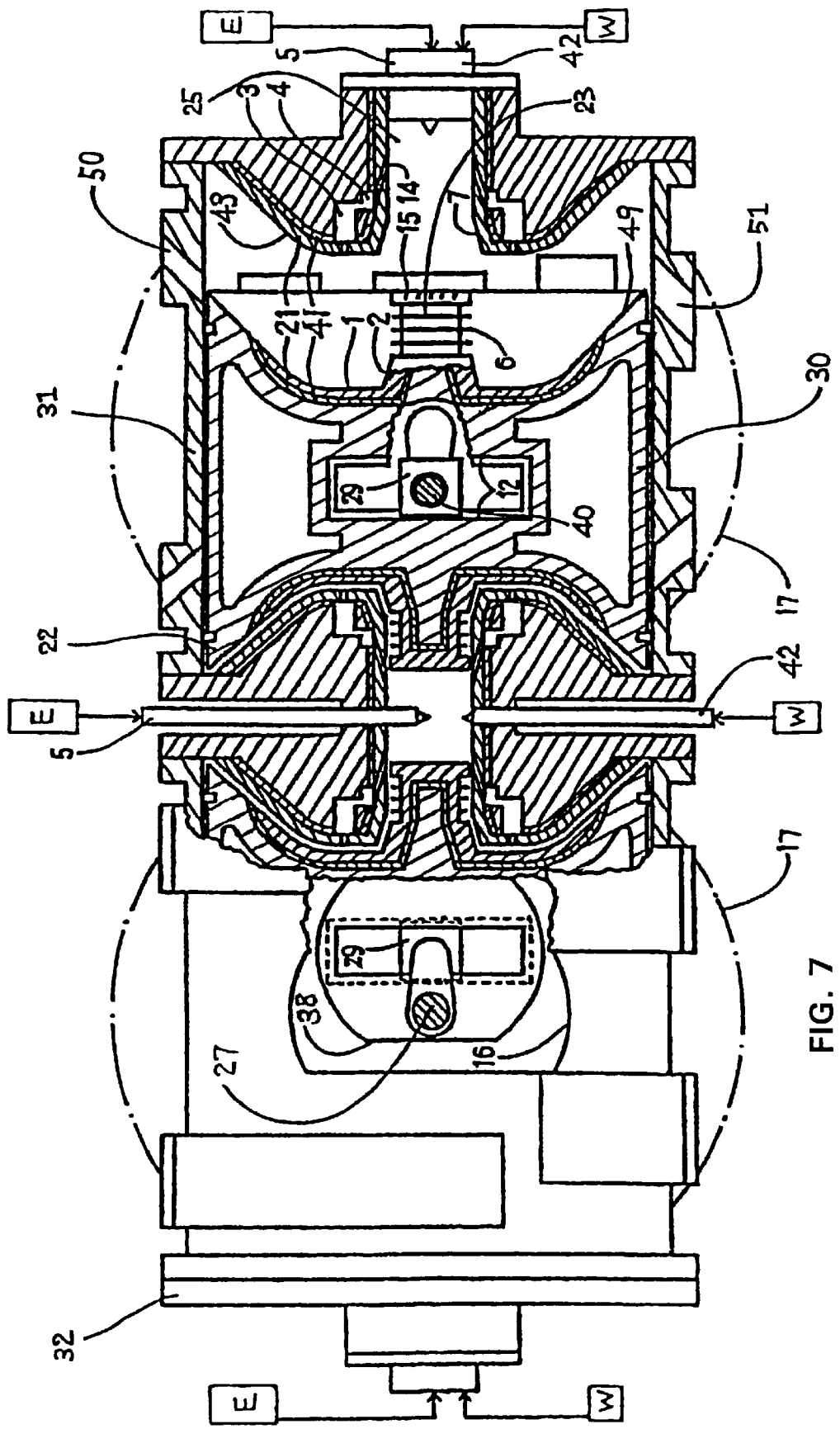
FIG. 7 is a partial sectional view of an embodiment of an energy conservation cycle engine of type E according to the invention.

An embodiment of an energy conservation cycle internal combustion engine of type E shown in FIG. 7 is described.

The basic part of the energy conservation cycle engine is similar to the engine, which has been already explained above.

In this embodiment, by the engagement synchronous means 17 coupled oppositely, the opposite reciprocating motions of the respective dual enlarged piston head in the embodiment of an energy conservation cycle internal combustion engine of type D are synchronized to greatly reduce the vibration, thereby a very-large-scale energy conservation cycle internal combustion engine of type E is able to be realized.

That is, from the nearby central portions of the recesses 1 having tapered periphery sections 49 of the enlarged piston heads of the right and left sides of the respective dual enlarged piston head provided oppositely, the small pistons having the tapered bottom sections 2 protrude, whereby the dual enlarged piston heads are facilitated to perform the opposite reciprocating motion between outer dead centers and inner dead centers. Before and after the respective outer dead center and before and after the respective inner dead center, the conventional scavenging and exhausting are performed through the inclined scavenging ports 50 and the inclined exhaust ports 51 respectively.

In the compression process after scavenging, by the tapered bottom section 2, the sword guard projections and depressions 6 and the small pistons provided with a plurality of noise reducing grooves 15 extending parallel or inclinedly with respect to the moving direction in a manner to maintain the rear ends as required on the peripheries of the projections wide of the tips, the isolation of the main combustion chambers 25 with the reduced diameter having the tapered reduced diameter portions 7 respectively are initiated, subsequently, the air compressed in the main combustion chambers with the expanded diameter are injected respectively from a plurality of inclined air passages 14 through the one-way air channels 4 including the respective check valves 3 inserted and fixed from the combustion chambers with the expanded diameter side in a slanting direction in the respective main combustion chambers with the reduced diameters and to be churned and mixed with the fuel injected from the respective fuel injection devices 5 to realize a constant volume extreme approach isolated combustion in the respective main combustion chamber with the reduced diameter. In the main combustion chambers 25 with the reduced diameter exceeding a certain volume, water injection by the water injection means 42 further can be performed, whereby a steam and internal combustion coalition engine can be realized.

When the respective dual enlarged piston head begins to retract, the pressure in the respective combustion chambers with the expanded diameter begin to reduce, whereby by means of the sword guard-like projections and depressions 6 provided on the peripheries of the small pistons in a multi-stage form, the pressure is reduced in multiple stages to establish a leak of the combustion gas optimally.

When the enlarged piston heads further retract respectively, the isolated combustion in the main combustion chamber with the reduced diameter is released, and while first, by the noise reducing grooves 15 of the respective small pistons, the injection direction of the combustion gas is established, the sounds are reduced, while secondly, the respective tapered reduced diameter portions 7 constitute the fan-shaped nozzles to inject a combustion gas into the recesses 1 correctly and at a high speed to greatly increase the rotating force, in a high speed injection process a high-speed injection and churn combustion by the large difference in pressure is realized, whereby the uncombusted portion is eliminated completely. Furthermore, by a reaction plus an impulse and a pressure due to the speed-type mass energy and the volume-type energy, the respective enlarged piston head is retracted strongly to generate a great rotational force to improve the thermal efficiency and to greatly reduce environmental pollution, and to shift to the respective conventional scavenging and exhausting. The inclined scavenging ports 50 are slanted in a manner to provide an inclined angle to tapered periphery sections 49 to inject a scavenging gas onto the bottom of the recesses 1 and the inclined exhaust ports 51 are slanted mainly in the reverse direction thereto to improve the scavenging efficiency. In the energy conservation cycle engine of type E shown in FIG. 7, by the synchronous means 17, the opposite reciprocating motions of the dual enlarged piston heads are synchronized to reduce the vibration greatly, whereby a very-large-scale energy conservation cycle internal combustion engine of type E can be realized.

Inclined scavenging ports 50 and the inclined exhaust ports 51 are provided at each cylinder respectively, and the combustion chambers with the expanded diameters are defined by the cylinder heads and the enlarged piston heads. Furthermore, in the approximate centers of the cylinder heads, the main combustion chambers with the reduced diameter having the tapered reduced diameter portions 7 are defined, and such that the fuel can be injected and combusted, fuel injection devices 5 are provided respectively. Moreover, the water injection means 42 for modifying the combustion to a combustion which reduces NOx greatly are additionally provided respectively, and various members are provided as the heat resistance, corrosion resistance and heat insulation structure. Moreover, since as is mentioned above, for the energy conservation cycle engine, the shortened stroke engine or a very-shortened stroke engine is preferable, in the case of providing a compression ignition engine, in order to reduce a useless volume, said heat resisting and corrosion resisting materials 21 may be the materials which elasticity is combined as required. On a nearby central position of the respective dual enlarged piston head and in the radial direction, the parallel tracks 12 for rotating the crankshaft by reciprocating motion are provided in parallel respectively to insert and retain the crankshaft side cams 40 or the respective crankshaft side translation bearings 29, which are rotatably freely and pivoted to the crankshaft between the respective parallel tracks 12 in a manner to reciprocally move freely respectively. The respective crankshaft including the engagement synchronous means 17 by the opposite reciprocating motions of the respective dual enlarged piston head is directly rotated to produce rotational power.

Figure 8:
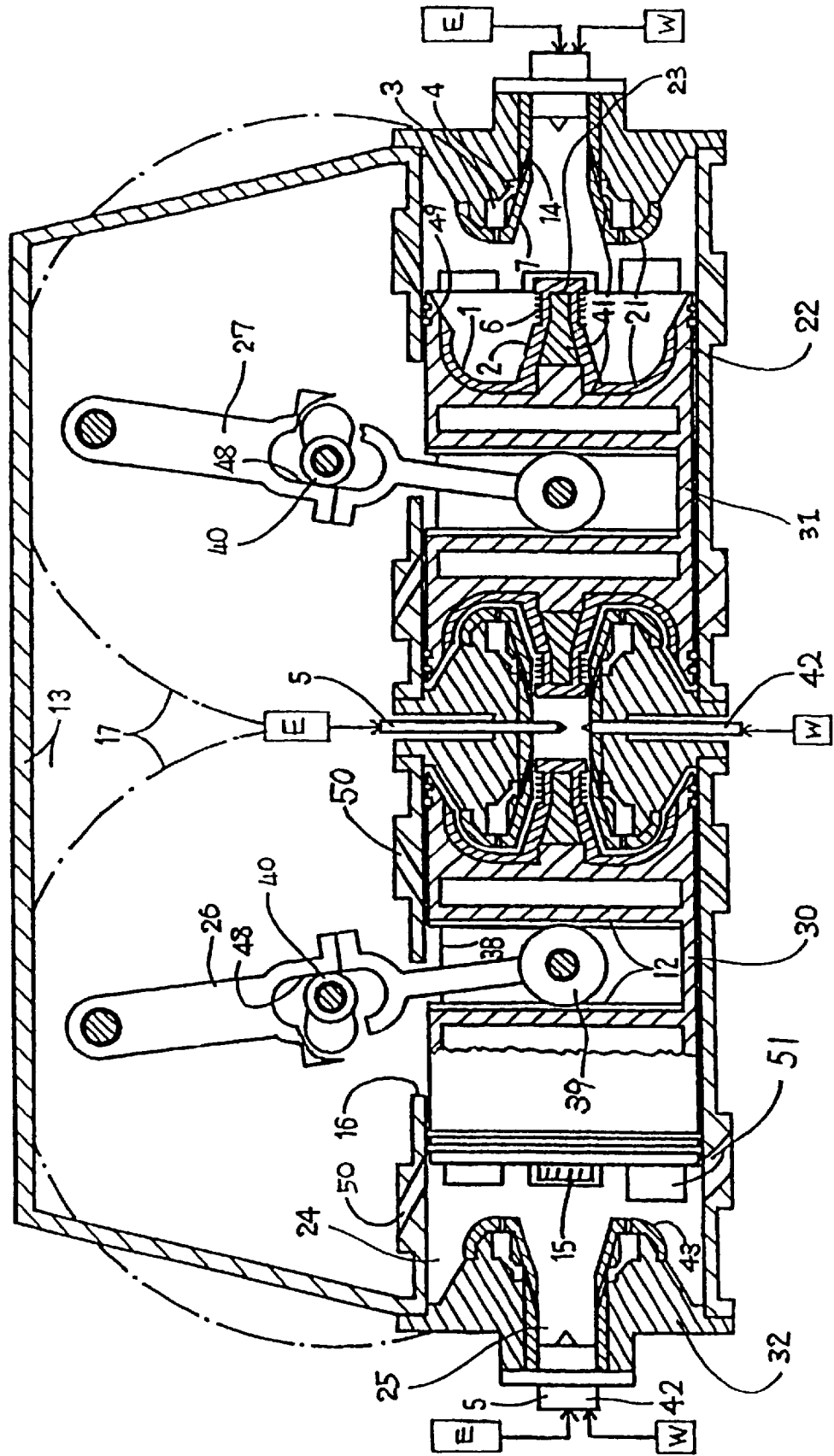
FIG. 8 is a partial sectional view of an embodiment of an energy conservation cycle engine of type C according to the invention.

With reference to FIG. 8, an embodiment of the energy conservation cycle internal combustion engine of type C is described.

Since a primary section of the energy conservation cycle engine of type C is similar to said energy conservation cycle engine of type E shown in FIG. 7, the opposed pendulum piston crank mechanism is described.

In the energy conservation cycle engine of type C, said energy conservation cycle engines of type B shown in FIG. 5 and FIG. 6 are combined respectively oppositely, by the respective pendulum arm, the crankshafts and the engagement synchronous means 17, the opposite reciprocating motion of the dual enlarged piston heads is synchronized to greatly reduce vibration, whereby a very-large-scale energy conservation cycle engine of type E can be realized.

Although when a top-surface shape of the dual enlarged piston head is formed into a deep recess, the combustion gas injected at a high speed from the tapered reduced diameter portion 7 can be facilitated to be trapped to reduce a heat load, the scavenging effect deteriorates, whereby, in the case that the scavenging effect is taken seriously, other than forming the periphery into a tapered shape, the recess may be formed into a shallow shape increasingly to make it a plane shape. In response thereto, a projection 43 also being accepted is formed into the plane shape. When the combustion chambers with the reduced diameter are reduced to one fifth to perform the isolated combustion, the maximum bearing load due to the maximum combustion pressure can be reduced to one twenty-fifth, whereby the maximum bearing load also is greatly reduced up to a maximum compression pressure, so that NOx caused by a great increase in the maximum combustion pressure by which the maximum compression pressure is greatly increased also can be reduced. By the reciprocating motion of the two-cycle dual pendulum piston in which the decrease and loss of the kinetic energy are very insignificant, the crankshaft including the engagement synchronous means 17 through the pendulum arm is rotated to produce a rotational power.

Figure 9:
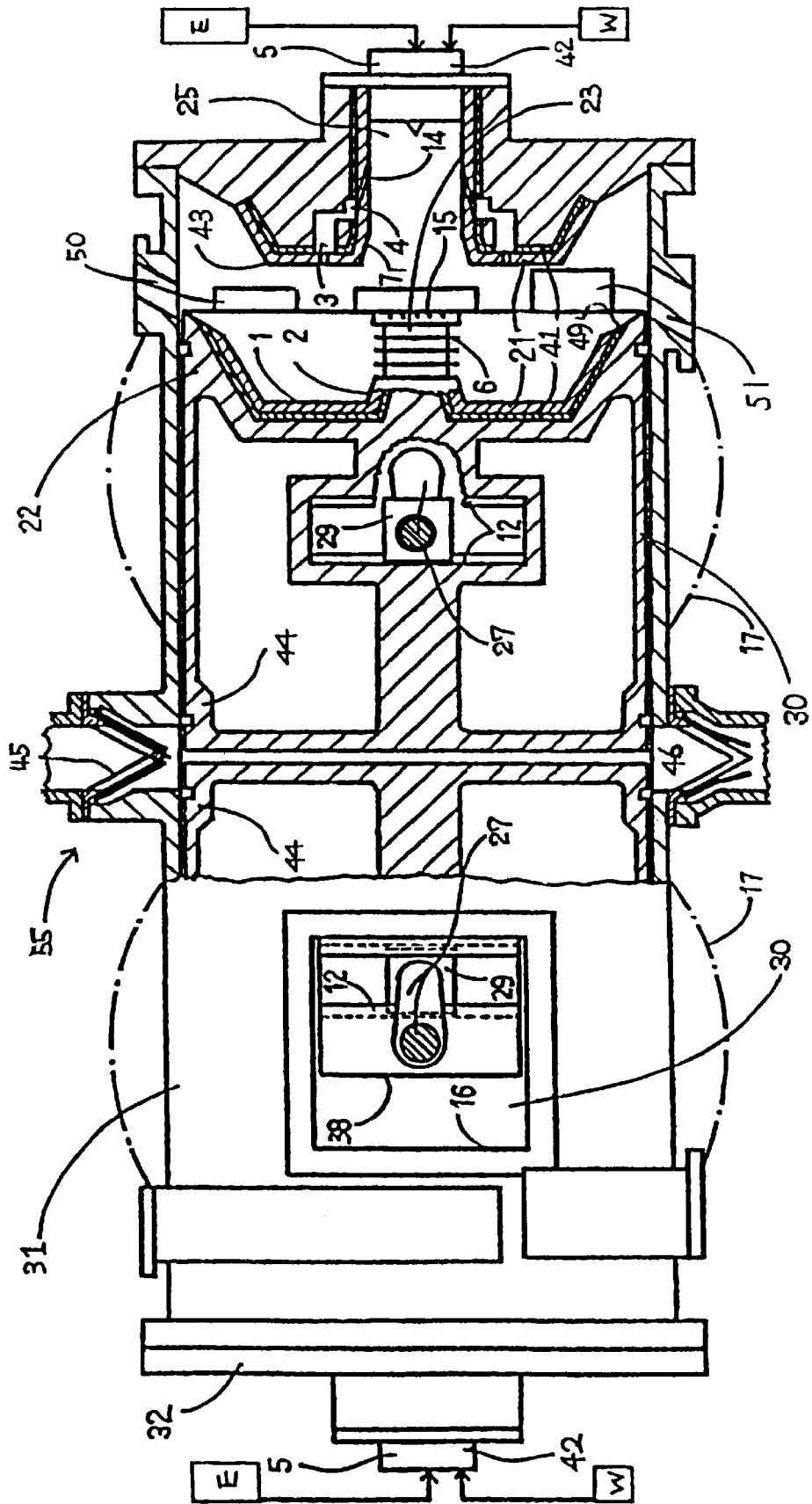
FIG. 9 is a partial sectional view of an embodiment of an energy conservation cycle engine of type F according to the invention.

With reference to FIG. 9, an embodiment of the energy conservation cycle internal combustion engine of type F is described.

The respective inside of the dual enlarged piston heads is provided as a supercharging piston 44.

On a little to the right and left center of the respectively cylindrical cylinder provided oppositely, the inclined scavenging ports 50 and the inclined exhaust ports 51 defining the inclined injection ports respectively are provided inclinedly in the opposite direction to each other. Between the cylinder heads fixed to the right and left and the respective enlarged piston head of the dual enlarged piston heads, the combustion chambers with the expanded diameter are provided and the respective inside of the dual enlarged piston heads is provided as the supercharging pistons 44. Moreover, between the supercharging pistons 44, the piston superchargers are defined, on the approximate centers of the cylinder heads, the combustion chamber with the reduced diameter are provided respectively, such that the fuel can be injected and combusted, the fuel injection devices 5 are provided respectively, and the water injection means 42 for combusting and greatly reducing NOx caused by the combustion further are additionally provided respectively.

In order to eliminate the cooling loss from the main combustion chamber with the reduced diameter and the combustion chamber with the expanded diameter, by heat resisting and corrosion resisting materials 21 and heat insulating materials 41, each member as described above is provided as a heat resistance, corrosion resistance and heat insulation structure, and on the peripheries of the recesses 1, the inclined periphery sections 49 provided at an angle to the inclined scavenging ports 50 improving the scavenging efficiency are provided.

Moreover, since as is mentioned above, for the energy conservation cycle engine, the shortened stroke engine or a very-shortened stroke engine is preferable, on the central portion, a piston supercharger which makes the improvement in a compression ratio possible by a very high supercharging is provided and moreover, the piston supercharger is designed to be constituted by the supercharging piston 44 and, a charging valve 45 and a feed valve 46, whereby the charging valve 45 communicates with the turbocharger side and the feed valve 46 communicates with the inclined scavenging port 50, thereby the compression ratio being able to be greatly improved.

On the nearby central positions of the respective dual enlarged piston head and in the radial direction, the parallel tracks 12 for rotating the crankshafts by the opposite reciprocating motion are provided in parallel respectively to insert and retain the crankshaft side cams 40 or the respective crankshaft side translation bearing (including a slide way) 29 which is rotatably outer-fitted and pivoted to the crankshaft between the respective parallel track 12 in a manner to reciprocally move freely respectively, and the respective crankshaft including the engagement synchronous means 17 is rotated directly by the opposite reciprocating motion of the dual enlarged piston heads to produce rotational power.

Figure 10:
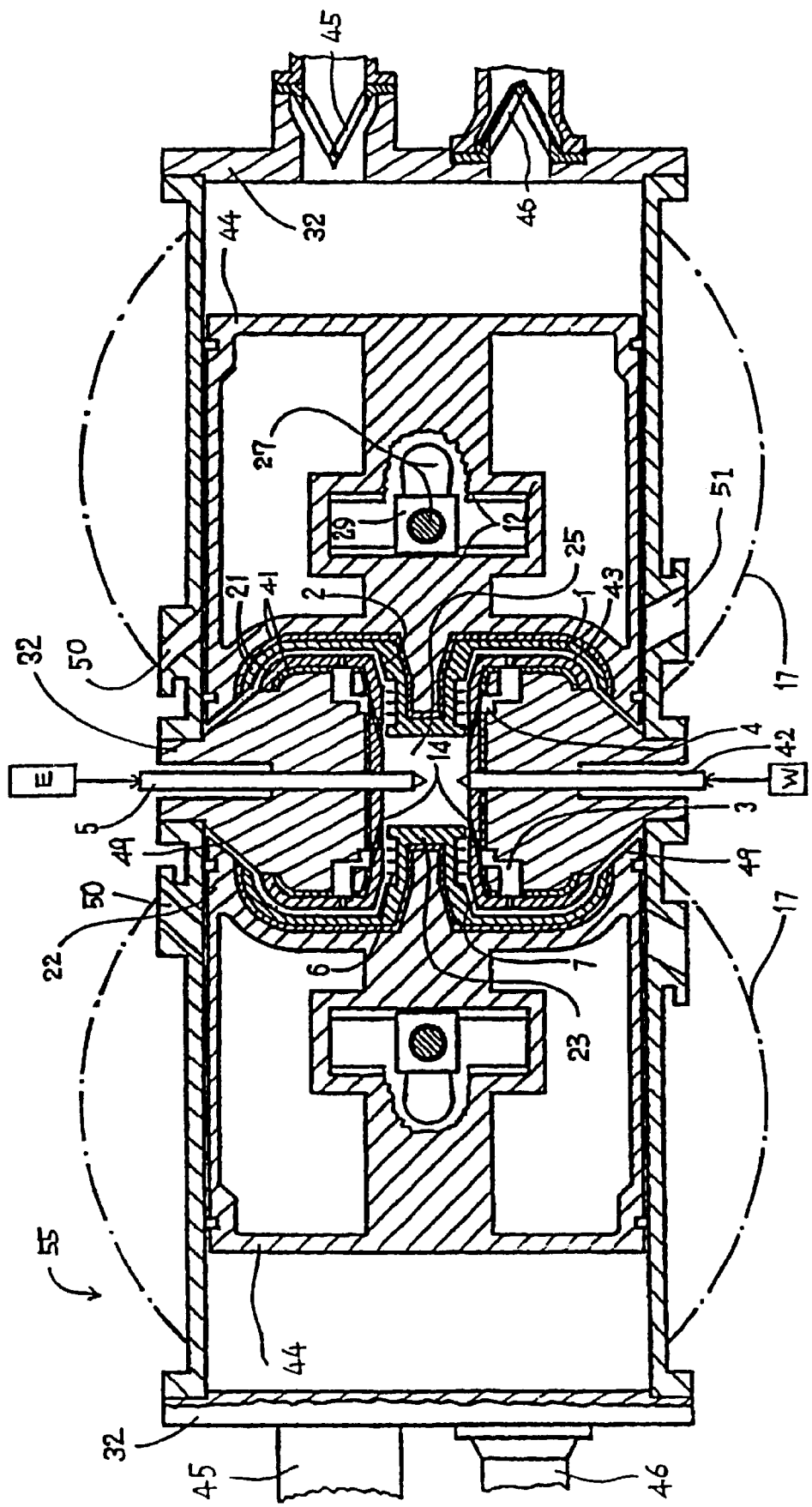
FIG. 10 is a partial sectional view of an embodiment of an energy conservation cycle engine of type G according to the invention.

An embodiment of the energy conservation cycle internal combustion engine of type G shown in FIG. 10 is described.

A two-cycle energy conservation cycle engine of type G is a very-large-scale energy conservation cycle internal combustion engine in which a variable compression ratio is improved by coupling the respective cylinder oppositely by the inner cylinder; and synchronizing the opposite reciprocating motions of the respective dual enlarged piston head by the engagement synchronous means 17 to greatly reduce vibration.

Then, a great rotational force is generated to improve the thermal efficiency, greatly reduce environmental pollution and shift to the respective conventional scavenging and exhausting, and the inclined scavenging ports 50 are slanted in a manner to provide an inclined angle to the tapered periphery sections 49 to inject the scavenging gas onto the bottom of the recesses 1. At this time, the inclined exhaust ports 51 can be designed to be slanted mainly in the reverse direction thereto to improve the scavenging efficiency.

Specifically, on the right and left sides of the respective cylinder provided oppositely, the cylinder heads are fixed respectively to be coupled oppositely, and at a little to the right and left center of the respective cylinder, tapered periphery sections provided at a slant to the inclined scavenging ports 50 for improving the scavenging efficiency are provided, and the inclined scavenging ports 50 for injecting the scavenging gas onto the bottom of the recesses 1 and the inclined exhaust port 51 slanted in the reverse direction thereto are provided.

On the inside between the cylinder heads fixed to the right and left respectively and the dual enlarged piston head, the combustion chambers with the expanded diameter are defined, and on the outside therebetween, the piston superchargers are defined respectively, and at an approximate center of the respective inner cylinder head, the combustion chambers with the reduced diameter are defined respectively and communicate with each other. Then, providing the charging valve 45 including a lead valve and the feed valve 46 on the respective outer cylinder head, the air is supplied from the turbocharger side to the piston, and in order to feed the air, during the feeding of the air, the charging valve 45 and the inclined scavenging port 50 communicate with the feed valve 46, on the respective combustion chamber with the reduced diameter, the fuel injection devices 5 are provided, and the water injection means 42 for improving the combustion so that NOx is greatly reduced are provided and in order to eliminate the cooling loss from the main combustion chamber with the reduced diameter and the combustion chamber with the expanded diameter, each member further is provided as a heat resistant, corrosion resistant and heat insulated structure by heat resisting and corrosion resisting materials 21 and heat insulating materials 41.

Although, as is mentioned above, for the energy conservation cycle engine, the shortened stroke engine or a very-shortened stroke engine is preferable, in the case of the very-shortened stroke engine, a great improvement in the compression ratio is hard, whereby by said piston supercharger, very high supercharging, including the turbocharger, can be realized.

On nearby central positions of the outside of the respective dual enlarged piston head and in the radial direction, parallel tracks 12 for rotating the crankshaft by the reciprocating motion are provided in parallel respectively. Moreover, the crankshaft side cams 40 or the respective crankshaft side translation bearings 29 which is rotatably outer-fitted and pivoted to the crankshaft are inserted and retained between the respective parallel tracks 12 in a manner to reciprocally move freely respectively, and by the opposite reciprocating motion of the respective dual enlarged piston head, the respective crankshafts including the engagement synchronous means 17 is directly rotated to produce a rotational power.

Figure 11:
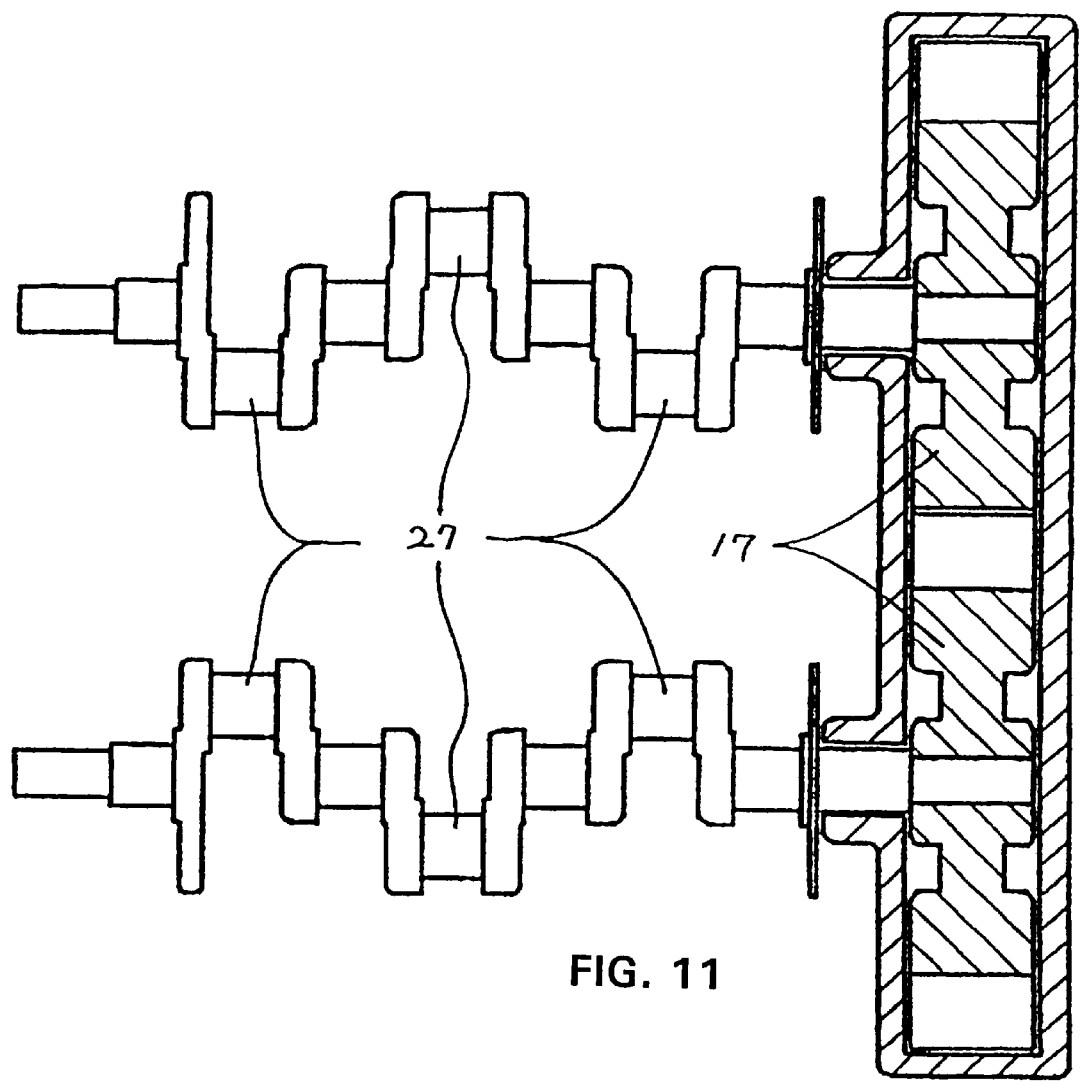
FIG. 11 is a partial sectional view for comparing and describing a utilization method of a crankshaft, including the crankshaft and an engagement synchronous means of the energy conservation cycle engine according to the invention.

With reference to FIG. 11, an example of a crankshaft is described. In an energy conservation cycle engine of type A, since in accordance with the conventional manner, to one crankshaft 27 the cylinder is coupled by one cylinder, a three-cylinder engine can be realized. In the case of energy conservation cycle engines of type B and type D, since to a piece of crankshaft, the cylinders is coupled by two cylinders in increments of two cylinders such as two cylinders, four cylinders, six cylinders and eight cylinders, a multiplication in cylinder members can be realized. In the case of energy conservation cycle engines of type C, type E, type F and type G, two pieces of the crankshaft are required, and since in type C and type E of these systems, the cylinders are coupled by four cylinders, increments of four cylinders, such as four cylinders, eight cylinders and twelve cylinders, multiplication in cylinder numbers can be realized. Moreover, in the case of energy conservation cycle engines of type F and type G, since the cylinders are coupled by two cylinders, by coupling with two cylinders in increments of two cylinders such as two cylinders, four cylinders, a multiplication in cylinders can be realized.

Moreover, although due to the system having a crankshaft of two pieces, a synchronous means such as an engagement synchronous means using a gear is required and the vibration can be greatly reduced, thereby to be adapted to the increase in output of the engine.

With reference to FIG. 12, a mounting method of crankshafts of the energy conservation cycle engines of type D, type E, type F and type G is described.

On the nearby central position and in the radial direction, and in the axial direction of the cylinder and into a cross-like form, the cylinder bore 16 and a cylinder-side parallel track assembling port 52 are provided, further, on the nearby central position and in the radial direction, and in the axial direction of the dual enlarged piston head and into a cross-like form, the piston bore 38 and the cylinder-side parallel track assembling port 52 are provided. The space is provided such that the parallel track 12 can be fixed and the crankshaft can be facilitated in assembly, rotation and reciprocation, and under the condition that the crankshaft side translation bearing 29 or the crankshaft side cam 40 is mounted on the crankshaft, the crankshaft is inserted and fixed therein. Accordingly, since, when the piston stroke approaches a piston diameter, the parallel track 12 and the crankshaft protrude to the cylinder side, whereby the parallel track assembling port 52 extends in the axial direction and in the direction of the periphery by the required amounts. Moreover, the crankshaft is pivoted outside the cylinder by the bearing unit 47.

Figure 13:
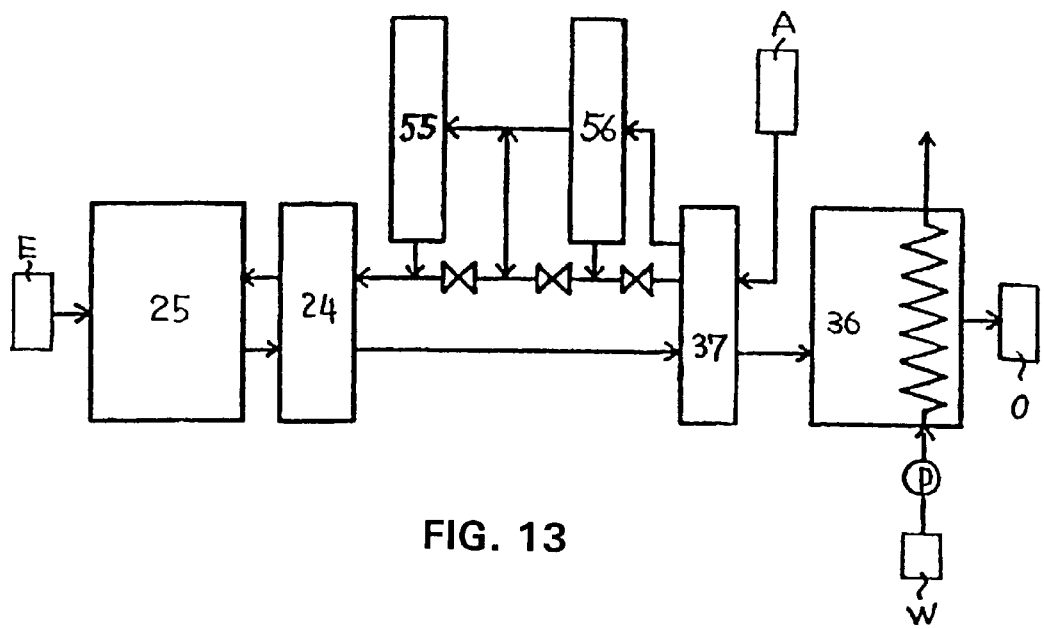
FIG. 13 is a general view showing an embodiment of the energy conservation cycle engine according to the invention.

With reference to FIG. 13, an embodiment of an energy conservation cycle engine is described. This embodiment is adapted to a very-small-scale or a small-scale engine.

Since the combustion chamber is small, the chamber tends to be cooled, whereby this embodiment is not adapted for water-injection. In this embodiment, the turbocharger 37 is used in order to respond to the combustion.

By the exhaust gas energy from the main combustion chamber with the expanded diameter 24, the turbocharger 37 is driven. First, the air A sucked and compressed by the turbocharger 37 is supplied to the main combustion chamber with the expanded diameter 24, and is, at completion of the compression stroke, supplied from the main combustion chamber with the expanded diameter 24 to the main combustion chamber with the reduced diameter 25. Since a large amount of air is compressed to be supplied into the main combustion condition, even in the very-small-scale or the small-scale engine, the output can be increased.

Figure 14:
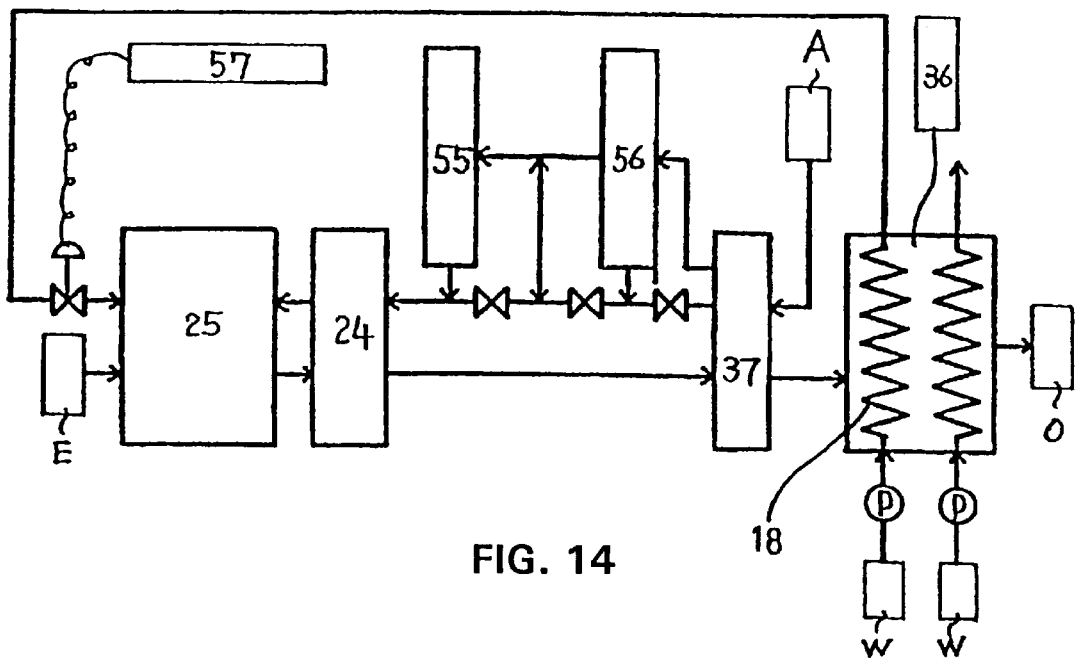
FIG. 14 is a general view showing another embodiment of the energy conservation cycle engine according to the invention.

With reference to FIG. 14, another embodiment of an energy conservation cycle engine is described. This embodiment is adapted to a small-scale or a middle-scale engine. In the small-scale or the middle-scale engine, although, using an adiabatic combustion chamber, water-injection becomes possible and a second embodiment of the invention is best adapted.

Soon after combustion, when the water heated in the exhaust section as required is supplied to the combustion chamber, a combustion causing neither NOx nor an uncombusted portion can be realized. By the exhaust gas energy from the main combustion chamber with the expanded diameter 24, the turbocharger 37 is driven. At this time, when the combustion gas is expanded up to atmospheric pressure, the water vapor contained in the combustion gas is expanded, whereby the driving force of the turbocharger 37 is increased. This water vapor was expanded by the vaporization latent heat of 540 calorie up to 1700 times. The air sucked and compressed more than usual by the turbocharger 37 is supplied to the main combustion chamber with the expanded diameter 24, and is, at completion of the compression process, supplied from the main combustion chamber with the expanded diameter 24 to the main combustion chamber with the reduced diameter 25. Since the turbocharger 37 is driven by water vapor, the output can be increased.

Figure 15:
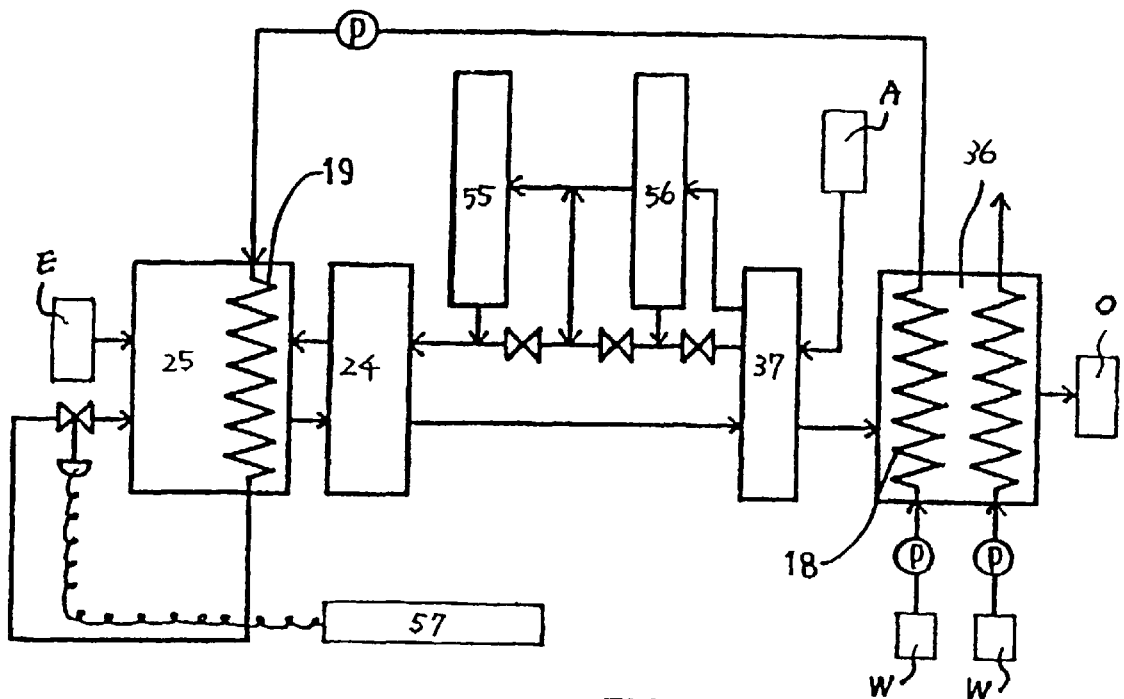
FIG. 15 is a general view showing a further embodiment of the energy conservation cycle engine according to the invention.

With reference to FIG. 15, still another embodiment of the energy conservation cycle engine is described. This embodiment is adapted to a small-scale or middle-scale engine.

In the case of a large combustion chamber, an adiabatic combustion chamber is best facilitated. Moreover, since in an adiabatic combustion chamber exceeding a certain volume, the combustion temperature exceeds 3500° C., so that the combustion pressure also is increased, by water injection, NOx gases can be eliminated completely.

Soon after combustion, when the water heated by an exhaust-section heat exchanger means 18 and a reduced diameter section heat exchanger means 19 is supplied to the combustion chamber as required, a combustion causing neither NOx gas nor an uncombusted portion can be realized. By the exhaust gas energy from the main combustion chamber with the expanded diameter 24, the turbocharger 37 is driven. At this time, when the combustion gas is expanded to atmospheric pressure, the water vapor contained in the combustion gas is expanded, whereby the driving force of the turbocharger 37 is increased. This water vapor was expanded by a vaporization latent heat of 540 calorie up to 1700 times. The air, sucked and compressed more than usual by the turbocharger 37, is supplied to the main combustion chamber with the expanded diameter 24 and is, at completion of the compression stroke, supplied from the main combustion chamber with the expanded diameter 24 to the main combustion chamber with the reduced diameter 25. Since the turbocharger 37 is driven by water vapor, moreover, the combustion temperature and the combustion pressure also are increased, and the output can be increased.

Figure 16:
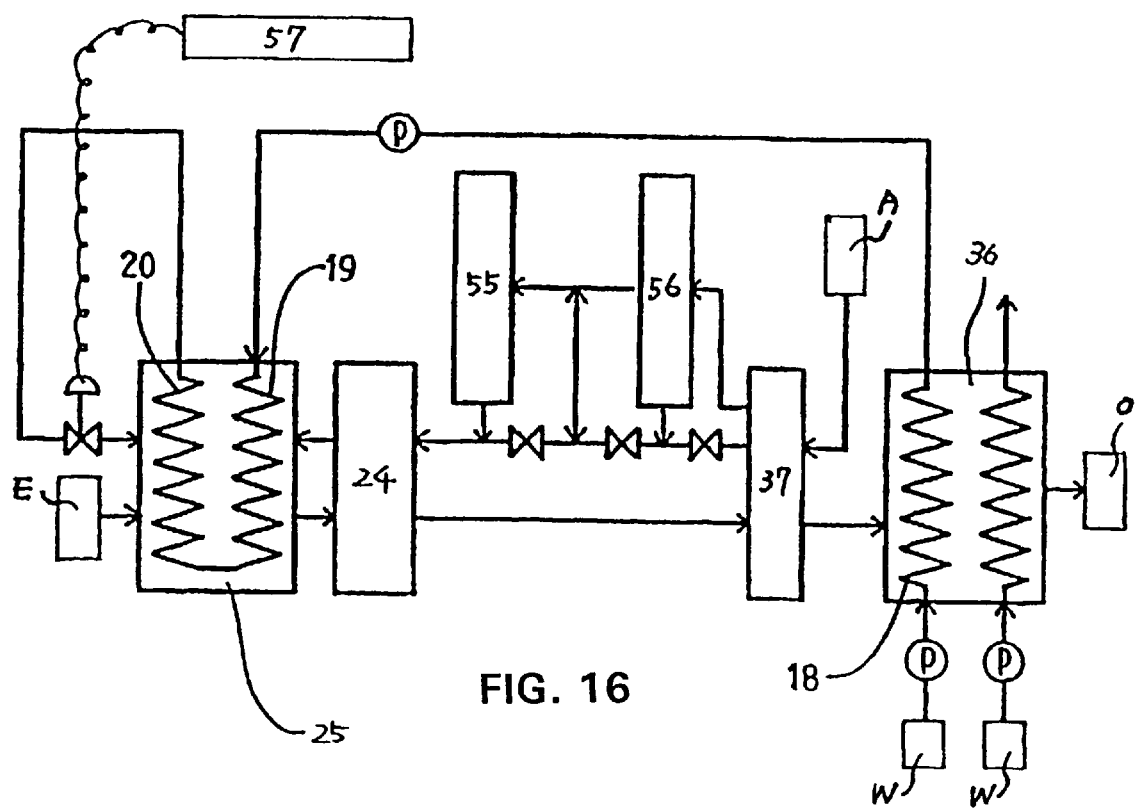
FIG. 16 is a general view showing a yet further embodiment of the energy conservation cycle engine according to the invention.

With reference to FIG. 16, a further embodiment of the energy conservation cycle engine is described. This embodiment is adapted to a large-scale or a very-large-scale engine.

In the large-scale or the very-large-scale engine, an adiabatic combustion chamber is essentially required. Since in a large-scale adiabatic combustion chamber exceeding a certain volume, the combustion temperature exceeds 3500° C. so that the combustion pressure also is increased, the amount of NOx gases is increased. Moreover, the combustion time is extended. Therefore, by injecting the water at as high a temperature as possible in high amounts, the combustion temperature is reduced, thereby NOx gases are able to be eliminated completely.

Soon after combustion, when the water is heated by an exhaust-section heat exchanger means 18, a reduced diameter section heat exchanger means 19 and a combustion section heat exchanger means 20 is supplied to the combustion chamber as required, a combustion causing neither NOx gases nor an uncombusted portion can be realized. By the exhaust gas energy from the combustion chamber, the turbocharger 37 is driven. When the combustion gas is expanded up to atmospheric pressure, the water vapor contained in the combustion gas is expanded, whereby the driving force of the turbocharger 37 is increased. This water vapor was expanded by the vaporization latent heat of 540 calorie up to 1700 times. The air, sucked and compressed more extensively than usual by the turbocharger 37, is supplied to the main combustion chamber with the expanded diameter 24, and is, at completion of the compression stroke, supplied from the main combustion chamber with the expanded diameter 24 to the main combustion chamber with the reduced diameter 25.

As described above, for a heat supplying means for feeding a hot water or the like, an exhaust heat recovery heat exchanger means is provided separately on the exhaust section, and in the case that the exhaust-section heat exchanger means 18 is provided, the exhaust heat recovery heat exchanger means is preferably provided on the downstream section thereof. Moreover, since for a great improvement in the compression ratio, a shortened stroke engine or a very-shortened stroke engine is preferable, between the downstream section of the turbocharger and the upper flow section of the combustion chamber with the expanded diameter, a mechanical supercharger can be added, or the engagement synchronous means 17 can be used as the mechanical supercharger. In the case of further improving the compression ratio greatly, the energy conservation cycle internal combustion engines type F or type G are used and by addition of the piston supercharger, the compression ratio is improved greatly. Moreover, when improving the compression ratio greatly, the embodiment common to the energy conservation cycle engines type D, type E, type F and type G is realized, the piston stroke is formed into the approximate piston diameter, the parallel track 12 is extended outside the cylinder and the piston length is elongated by the required amounts.

INDUSTRIAL APPLICABILITY

According to the invention, by providing two combustion chambers using the specifically-shaped piston and cylinder, the thermal energy can be used as rotational energy effectively.

Moreover, at least a part of the cup-like recess of the piston is formed into a linear form, and on the cylinder of the piston, a scavenging port and an exhaust port are provided, whereby a scavenging effect can be improved.

Furthermore, according to the invention in which, a main combustion chamber with a reduced diameter having a tapered reduced diameter portion which is reduced, for example, up to one fifth in diameter is provided with a one-way air channel, thereby allowing an isolated combustion to be realized, there are the large effects as follows:

(1) since the combustion during a period of the isolation can be approached to a constant volume combustion increased up to twenty-five times as compared with the prior art, NOx gases and an uncombusted portion can be eliminated completely and environmental pollution can be reduced;

(2) a steam and internal combustion coalition engine in which water-injection is provided additionally can be realized, whereby NOx gases and an uncombusted portion can be eliminated completely, moreover, by an increase in speed-type mass energy using water vapor, which is easy to compress, and an increase in volume-type speed energy, which is expanded by a vaporization latent heat of 540 calorie up to 1700 times, NOx gases can be reduced;

(3) by adding a tapered reduced diameter portion, at the release of the isolated combustion, a combustion-gas jet flow under a high pressure is injected into the cup-like recess effectively and correctly, whereby a rotational force can be increased. Moreover, the combustion is designed to be performed while being churned by a difference in pressure, whereby the uncombusted portion can be eliminated completely;

(4) the influences of a maximum combustion pressure and an abnormal combustion are reduced by one twenty-fifth. The friction loss and vibration are reduced. The equivalent to a minimum bearing load also is reduced by one twenty-fifth as compared with the prior art. Since the maximum bearing load is reduced from a maximum combustion pressure to a maximum compression pressure, by increasing the maximum compression pressure, NOx gases can be reduced;

(5) since a high pressure combustion chamber becomes the isolated combustion chamber which is reduced up to one fifth in diameter, a high pressure combustion chamber having a main combustion chamber with a diameter and which is also reduced to one fifth in wall thickness and in weight can be realized. The combustion chamber with the expanded diameter becomes a thin-walled combustion chamber which is reduced in pressure and temperature by a large amount, whereby, a specific weight per output can be reduced in weight as compared with the prior art by a large amount;

(6) without reference to the kind of fuel, fuel ignition system, number of cycles, scavenging system and type of engine, an improvement in a combustion method, increase in rotational force and reduction in a specific weight per output can be achieved;

(7) when by the reciprocating motion of the dual enlarged piston head, the crankshaft is rotated directly to produce a rotational power, the component count can be reduced by a large amount to simplify the structure, as well as enabling a compact and lightweight, high-power and low fuel economy system to be realized; and (8) the shape of a piston is formed into a stepped shape having a portion in which the diameter is expanded having a cup-like recess, a portion in which the diameter is reduced protrudes therefrom and a cylinder head is formed into a shape capable of accepting said piston, said shape defining a first combustion chamber and a second combustion chamber, whereby, especially, injection of large amounts of water can be performed, so that an abnormal combustion which is most difficult in the case of hydrogen fuel can be eliminated, or even if the abnormal combustion occurs, the influence can be reduced to nearly one twenty-fifth, whereby, especially in the case that hydrogen fuel is used, an excellent performance can be expected.

With the energy conservation cycle engine according to the invention as described above, a power transmission device is provided thereon, thereby enabling it to be used in driving various instruments such as a ship, a vehicle, an electric power generator and an agricultural machinery effectively.

What is claimed is:

1. An energy conservation cycle engine comprising a first combustion chamber defined by a second piston and a cylinder head, and a second combustion chamber defined by a cup-like recess disposed at the top of a first piston and the cylinder head, wherein the second piston protrudes from the recess, the cylinder head is formed to fit the second piston, and the second combustion chamber communicates with the first combustion chamber through a one-way air channel having a check valve.

2. The energy conservation cycle engine according to claim 1, wherein a bottom of the second piston is formed into a tapered-shape, and the cylinder heads accepting the tapered second piston has a tapered lower end to fit the bottom of the second piston.

3. The energy conservation cycle engine according to claim 1, wherein the second piston has annular projections on a side thereof provided perpendicular to the moving direction of said piston.

4. The energy conservation cycle engine according to claim 1, wherein said second piston has a plurality of grooves extending obliquely to the motion of the piston at an upper portion thereof.

5. The energy conservation cycle engine according to claim 1, wherein at the top dead center, a gap between the first piston and the cylinder head becomes almost zero.

6. The energy conservation cycle engine according to claim 1, wherein a part of the cup-like recess of the piston consists of a straight line.

7. The energy conservation cycle engine according to claim 1, wherein the cylinder is provided with a scavenging port and an exhaust port.

8. The energy conservation cycle engine according to claim 1, wherein a crankshaft is connected to the piston to produce rotational power.

9. The energy conservation cycle engine according to claim 8, wherein, in order to rotate the crankshaft, the number of cylinders are in increments of two.

10. The energy conservation cycle engine according to claim 1, wherein a fuel injection device for injecting the fuel to said first combustion chamber is provided, and the injected fuel becomes turbulent with air flowing in through an inclined air passage.

11. The energy conservation cycle engine according to claim 1, wherein said the second piston and the recess are provided as a heat-resistant, corrosion-resistant and heat-insulated structure by utilizing heat-resistant, corrosion-resistant and heat-insulating materials.

12. The energy conservation cycle engine according to claim 1, wherein a water injection means is additionally provided for an isolated combustion in first combustion chamber, and an exhaust-section heat exchanger means is provided for pre-heating the water, and additionally comprising a reduced diameter section heat exchanger means and a combustion section heat exchanger means.

13. An energy conservation cycle engine comprising a first piston having cup-like-recesses at both ends thereof which form dual enlarged piston heads, first combustion chambers defined by second pistons protruding from the recesses and cylinder heads which conform with the second pistons and second combustion chambers defined by each cup-like recess of the first piston and cylinder heads, one-way channels having check valves communicating with each first and second combustion chamber, and a crankshaft coupled with the center of the piston to produce rotational power.

14. An energy conservation cycle engine according to claim 13, wherein the second combustion chambers and the first combustion chambers communicate with each other before and after the dead center through one-way air channels and a pendulum arm is connected with the first piston to rotate the crankshaft and produce rotational power.

15. The energy conservation cycle engine according to claim 14, wherein in order to rotate the crankshaft by the reciprocating motion of said first piston, in the radial direction near a central position of said first piston, a parallel track for retaining a pendulum side cam is provided, an upper end of a pendulum arm is supported by a body side in a manner to pendulate freely the pendulum arm hanged by the body side by the reciprocating motion of the dual enlarged head pistons, and the crankshaft side cam pivoted in the pendulum side parallel track of the pendulum arm in a manner to reciprocally move reciprocates, as well as the crankshaft rotatably born by the crankshaft side cam freely rotates to produce a rotational power.

16. The energy conservation cycle engine according to claim 14, wherein in order to rotate the crankshaft by the reciprocating motion of said first piston, in the radial direction near a central position of said first piston, a parallel track for retaining a pendulum side translation bearing is provided, a pendulum arm pendulates by the reciprocating motion of the first piston, and a crankshaft side translation bearing pivots in the parallel track for the pendulum arm in a manner to freely reciprocate, and the crankshaft pivots by the crankshaft side translation bearing freely rotating to produce a rotational power.

17. An energy conservation cycle engine according to claim 13, wherein the second combustion chambers and the first combustion chambers communicate with each other before and after the dead center through one-way air channels and a reciprocating motion is converted to rotational power by the crankshaft.

18. The energy conservation cycle engine according to claim 17, wherein in order to rotate said crankshaft, the number of cylinders are in increments of four.

19. The energy conservation cycle engine according to claim 17, wherein an engagement synchronous means for synchronizing opposite reciprocating motions of dual enlarged piston heads is provided on the crankshaft to synchronize the opposite reciprocating motions of the dual enlarged piston heads.

20. An energy conservation cycle engine according to claim 13, wherein the dual enlarged piston heads are disposed at opposite ends of the first piston, the first combustion chambers and the second combustion chambers communicate with each other before and after the dead center through one-way air channels and a pendulum arm is connected with the piston which rotates the crankshaft to produce rotational power.

21. The energy conservation cycle engine according to claim 20, wherein an engagement for a synchronous means for synchronizing the opposite reciprocating motions of dual enlarged piston heads is used as a mechanical supercharger.

22. An energy conservation cycle engine according to claim 13, wherein the dual enlarged piston heads are disposed at opposite ends of the first piston, both outer ends of the first piston have cup-like recesses, second pistons protrude from the recesses, the first combustion chambers and the second combustion chambers communicate with each other before and after the dead center through one-way air channels, and a crankshaft produces rotational power.

23. The energy conservation cycle engine according to claim 22, wherein supercharging pistons are disposed on the inside of said respective dual enlarged piston heads and charging valves and feed valves are provided on the piston superchargers.

24. An energy conservation cycle engine according to claim 13, wherein dual enlarged piston heads are disposed opposite to one another, inner ends of the first piston have cup-like recesses, the second pistons protrude from the recesses and the first combustion chambers and the second combustion chambers communicate with each other before and after the dead center through one-way air channels.

25. The energy conservation cycle engine according to claim 24, wherein supercharging pistons are disposed on the outside of said respective dual enlarged piston heads and charging valves and feed valves are provided on the piston superchargers.

26. The energy conservation cycle engine according to claim 13, wherein in order to rotate the crankshaft by a reciprocating motion of the first piston, in a radial direction near a central position of the inside of the first piston, parallel tracks, into which crankshaft side cams are fitted and pivoted rotatably to the crankshaft are inserted and retained in a manner to reciprocate freely, are provided oppositely.

27. The energy conservation cycle engine according to claim 13, wherein in order to rotate the crankshaft by a reciprocating motion of the first piston, in a radial direction near a central position of the inside of the first piston, parallel tracks, into which crankshaft side translation bearings are fitted and pivoted rotatably to the crankshaft are inserted and retained in a manner to reciprocate freely, are provided oppositely.

28. The energy conservation cycle engine according to claim 13, wherein in order to rotate the crankshaft by a reciprocating motion of the first piston, in a radial direction near central positions of the cylinders, cylinder bores and cylinder-side parallel track assembling ports are provided into a cross-like form.

29. The energy conservation cycle engine according to claim 13, wherein in order to rotate the crankshaft by a reciprocating motion of said first piston, in the radial direction near a central position of said first piston, a piston bore and a piston-side parallel track assembling port are provided into a cross-like form.

30. The energy conservation cycle engine according to claim 13, wherein a vicinity of said first combustion chamber is provided as a heat-resistant, corrosion-resistant and heat-insulated structure by utilizing heat-resistant, corrosion-resistant and heat-insulating materials, and in the heat-resistant and corrosion-resistant materials, inclined air passages for the one-way air channel are provided.

* * * * *